United States Patent
Wingle

(10) Patent No.: US 9,754,293 B1
(45) Date of Patent: *Sep. 5, 2017

(54) SYSTEM AND METHOD FOR ON-VEHICLE MERCHANDISING

(71) Applicant: R6 Mobile, LLC, Albany, NY (US)

(72) Inventor: John Wingle, Rotterdam, NY (US)

(73) Assignee: LotMonkey, LLC, Scotia, NY (US)

( * ) Notice: Subject to any disclaimer, the term of this patent is extended or adjusted under 35 U.S.C. 154(b) by 506 days.

This patent is subject to a terminal disclaimer.

(21) Appl. No.: 14/087,152

(22) Filed: Nov. 22, 2013

Related U.S. Application Data

(63) Continuation-in-part of application No. 13/452,051, filed on Apr. 20, 2012, now Pat. No. 9,582,810.

(51) Int. Cl.
*G06Q 30/00* (2012.01)
*G06Q 30/02* (2012.01)
*G09F 21/04* (2006.01)

(52) U.S. Cl.
CPC ..... *G06Q 30/0276* (2013.01); *G06Q 30/0265* (2013.01); *G09F 21/04* (2013.01)

(58) Field of Classification Search
CPC ........ G06Q 10/00–50/00; G06Q 90/00; G06Q 99/00
USPC ............................. 705/7.11–7.42, 14.1–14.73
See application file for complete search history.

(56) References Cited

U.S. PATENT DOCUMENTS

| | | | |
|---|---|---|---|
| 4,940,258 A * | 7/1990 | Cuba, Jr. | G09F 3/10 283/100 |
| 5,290,067 A * | 3/1994 | Langen | G09F 3/10 283/60.1 |
| 5,788,796 A * | 8/1998 | Look | B65C 11/04 156/234 |
| 6,119,101 A | 9/2000 | Peckover | |
| 6,352,608 B1 * | 3/2002 | Garden | B32B 7/06 156/247 |
| 6,442,276 B1 | 8/2002 | Doljack | |
| 6,494,375 B1 | 12/2002 | Ishibashi et al. | |
| 6,588,133 B1 * | 7/2003 | Garrity | G09F 17/00 40/591 |
| 6,637,662 B2 | 10/2003 | Itou et al. | |
| 6,640,477 B1 * | 11/2003 | Timpson | G09F 21/04 40/591 |
| 6,892,217 B1 | 5/2005 | Hanmann et al. | |
| 7,490,134 B2 * | 2/2009 | Ono | G06K 7/10722 235/437 |

(Continued)

OTHER PUBLICATIONS

"Database Integration", http://cars.liqueo.com/custom-integration. Publisher appears to be Liqueo, Inc. Date screen saved is Apr. 20, 2012.

(Continued)

*Primary Examiner* — Alan S Miller
(74) *Attorney, Agent, or Firm* — Maxine L. Barasch; Koehane & D'Alessandro, PLLC

(57) ABSTRACT

A system and method for on-vehicle merchandising is disclosed. Embodiments of the present invention combine vehicle specific information and standard detailed information about a vehicle and render multiple decals on a printed sheet for the vehicle, which forms an on-vehicle merchandising kit. The decals include pertinent information, such as price, and vehicle options. Mobile linked data, such as quick response codes, URLs, and text keywords are also included in the kit.

20 Claims, 24 Drawing Sheets

(56) References Cited

U.S. PATENT DOCUMENTS

| | | | |
|---|---|---|---|
| 7,502,133 B2 | 3/2009 | Fukunaga et al. | |
| 7,823,768 B2 | 11/2010 | Self et al. | |
| 8,055,539 B1 | 11/2011 | Kline | |
| 8,261,972 B2 | 9/2012 | Ziegler | |
| 8,511,572 B2 | 8/2013 | Bianconi et al. | |
| 8,583,795 B2* | 11/2013 | Chor | G06F 17/30879 709/225 |
| 2002/0097193 A1* | 7/2002 | Powers | G06Q 30/02 345/2.3 |
| 2002/0196297 A1* | 12/2002 | Stevens | B41J 3/407 347/4 |
| 2003/0139979 A1 | 7/2003 | Moore | |
| 2003/0200155 A1 | 10/2003 | Ouchi | |
| 2004/0088228 A1* | 5/2004 | Mercer | G06Q 10/08 705/28 |
| 2005/0228689 A1* | 10/2005 | Hagood | G06Q 10/10 283/94 |
| 2005/0261960 A1* | 11/2005 | Hoffey | G06Q 30/02 705/14.24 |
| 2006/0036590 A1 | 2/2006 | Kouchri et al. | |
| 2006/0080875 A1* | 4/2006 | Nelson | G09F 21/04 40/593 |
| 2006/0085208 A1* | 4/2006 | Nelson | G06Q 30/00 705/26.1 |
| 2006/0274369 A1 | 12/2006 | Yamamoto | |
| 2007/0019222 A1 | 1/2007 | Oda et al. | |
| 2007/0047782 A1 | 3/2007 | Hull et al. | |
| 2007/0115299 A1* | 5/2007 | Barney | G06T 11/60 345/619 |
| 2007/0214043 A1 | 9/2007 | Yasuda | |
| 2007/0215685 A1 | 9/2007 | Self et al. | |
| 2008/0097872 A1 | 4/2008 | Peckover | |
| 2008/0189609 A1* | 8/2008 | Larson | G06F 17/211 715/273 |
| 2008/0309976 A1 | 12/2008 | Inoishi | |
| 2009/0108057 A1* | 4/2009 | Mu | H04M 1/72561 235/375 |
| 2009/0157511 A1 | 6/2009 | Spinnell et al. | |
| 2010/0036509 A1 | 2/2010 | Salle et al. | |
| 2010/0088158 A1* | 4/2010 | Pollack | G06Q 30/02 705/7.35 |
| 2010/0099441 A1 | 4/2010 | Agarwal et al. | |
| 2010/0219973 A1 | 9/2010 | Griffin et al. | |
| 2010/0257210 A1* | 10/2010 | Witkin | G06F 17/30274 707/802 |
| 2010/0279667 A1 | 11/2010 | Wehrs et al. | |
| 2011/0029369 A1 | 2/2011 | Taylor et al. | |
| 2011/0196748 A1 | 8/2011 | Caron et al. | |
| 2011/0202471 A1* | 8/2011 | Scott | G06Q 30/0278 705/306 |
| 2011/0225053 A1 | 9/2011 | Durst | |
| 2011/0231316 A1 | 9/2011 | Carroll, III | |
| 2011/0264527 A1 | 10/2011 | Fitzpatrick et al. | |
| 2011/0264992 A1 | 10/2011 | Vishria et al. | |
| 2012/0179536 A1 | 7/2012 | Kalb et al. | |
| 2013/0006809 A1* | 1/2013 | Hollenshead | G06Q 30/06 705/26.41 |
| 2013/0013358 A1* | 1/2013 | Sears | G06Q 30/06 705/7.12 |
| 2013/0018732 A1* | 1/2013 | Evans | G06Q 30/02 705/14.72 |
| 2013/0032634 A1 | 2/2013 | McKirdy | |
| 2013/0151427 A1* | 6/2013 | Whelan | B65C 3/00 705/317 |
| 2013/0154800 A1 | 6/2013 | Holmes et al. | |
| 2013/0211941 A1* | 8/2013 | Hallowell | G06Q 30/06 705/26.1 |
| 2013/0262241 A1* | 10/2013 | Nelson | G06Q 30/0276 705/14.72 |
| 2014/0104656 A1* | 4/2014 | Crisp | G06Q 30/0276 358/1.18 |

OTHER PUBLICATIONS

"Barcode Management", http://tagomobile.com/features. Publisher appears to be Mobilex Group Technologies, Inc. Date screen saved is Apr. 20, 2012.

U.S. Appl. No. 13/452,051, Office Action, Jan. 31, 2014, 55 pages.

U.S. Appl. No. 13/452,051, Office Action, Aug. 28, 2014, 22 pages.

* cited by examiner

BANNER AD SUMMARY

| BANNER AD NAME | TYPE | LINK TO: | VIEW | DEL |
|---|---|---|---|---|
| Pre-owned Hondas | TEXT | www.honda.com | 🔍 | ✖ |
| New Fords | IMAGE | www.ford.com | 🔍 | ✖ |
| Dodge Trucks | TEXT | www.dodge.com | 🔍 | ✖ |

FIG. 13

CONTACT TOOLS SUMMARY

| NAME | STYLE | BK CLR | CALL | TEXT | EMAIL | VIEW | DEL |
|---|---|---|---|---|---|---|---|
| NEW CAR SALES | CALL | BLUE | 555-555-... | 555-555-... | will@geemail.com | 🔍 | 🗑 |
| USED CAR SALES | CALL | BLUE | 555-555-... | 555-555-... | ken@geemail.com | 🔍 | 🗑 |
| TRUCK SALES | CALL | BLUE | 555-555-... | 555-555-... | sue@geemail.com | 🔍 | 🗑 |

FIG. 14

SYSTEM AND METHOD FOR ON-VEHICLE MERCHANDISING

CROSS-REFERENCE TO RELATED APPLICATION

This application is a continuation-in-part of, and claims priority to, application Ser. No. 13/452,051 filed Apr. 20, 2012 for QUICK RESPONSE INFORMATION MANAGEMENT SYSTEM AND METHOD, the contents of which are incorporated herein by reference.

FIELD OF THE INVENTION

The present invention relates generally to on-vehicle merchandising, and more particularly to a system and method for producing an on-vehicle merchandising kit.

BACKGROUND

A quick response code, also known as a QR code, is a two-dimensional barcode that offers high-speed and omni-directional reading, and has a large information capacity, high reliability, and is compatible with diverse characters and image information. With the above-mentioned advantages, the QR code is therefore used in industrial management, electronic business and personal information exchanges, and many other fields. A user can scan (effectively take a picture of) the QR code with a QR code scanner on a digital camera or other device, and thereby retrieve embedded information of the QR code after the picture is identified and decoded by interpreting software. With the increasing popularity of mobile devices (e.g. "smart phones") that are capable of scanning QR codes and rendering associated content, an increasing number of retailers are using QR codes in a wide variety of applications such as automobile sales, electronics, and other types of merchandising. A retailer with a large number of inventory items may have many QR codes to manage. Therefore, it is desirable to have an improved system and method for quick response information management.

SUMMARY

In an aspect of the invention, an on-vehicle merchandising kit is provided having: a sheet of print-compatible material; a mobile linked display decal rendered on the sheet; a detailed vehicle description decal rendered on the sheet; a pricing graphic decal rendered on the sheet; and a windshield topper decal rendered on the sheet.

In another aspect of the invention, a method for producing an on-vehicle merchandising kit for a vehicle is provided having: retrieving standard detailed information for the vehicle; retrieving vehicle-specific information; retrieving mobile link information; and rendering a consumer content display kit which includes at least a portion of the standard detailed information, at least a portion of the vehicle-specific information, and the mobile link information.

In yet another aspect of the invention, there is provided a computer-readable storage medium comprising instructions, said instructions, when executed by a processor, performing the steps of: retrieving standard detailed information for the vehicle; retrieving vehicle-specific information; retrieving mobile link information; and rendering a consumer content display kit which includes at least a portion of the standard detailed information, at least a portion of the vehicle-specific information, and the mobile link information.

BRIEF DESCRIPTION OF THE DRAWINGS

These and other features of this invention will be more readily understood from the following detailed description of the various aspects of the invention taken in conjunction with the accompanying drawings in which:

FIG. 13 shows an EID banner ad summary screen.

FIG. 14 shows a contact tools summary screen.

DETAILED DESCRIPTION OF THE INVENTION

Embodiments of the present invention perform quick response information management functions to simplify previously time-consuming tasks that many retailers face. For the purposes of this disclosure, the term "tag" is used generally to refer to an alphanumeric and/or symbolic set of digits, which may be designed to iterate a keyword or be a random sample of digits. Examples of an alphanumeric tag, for the purposes of this disclosure, include: SAVINGS, SAVINGS21, 90125, SAVE@HOME, and LOSEW8.

The system generates tags, to which attributes may be associated by the system or the user. The inventive system allows a user to modify the information (attributes) associated with each tag, or for a number of tags in a group operation. The attributes include, but are not limited to, a QR code, a URL, a text keyword, a text phone number, a default banner advertisement, default contact information, a default website, a temporary banner advertisement, temporary contact information, and a temporary website.

Tag Attributes

For purposes of disclosure, an auto dealership is used here as an example. It will be recognized that the invention is not limited to application by auto dealerships, but that any suitable application is included within the scope of the invention. In the case of a dealership, inventory of, e.g., new and used vehicles, may change. The inventive system provides a platform in which a user may associate particular attributes with tags, to provide information to customers in the form of Consumer Content Displays and Electronic Information Displays (each defined herein below). In practice, the dealership may apply a Consumer Content Display (CCD) to each vehicle. As customers browse the dealership lot, they can use a device to scan a QR code, enter a short URL, or use other contact information contained, for example, on a CCD to obtain information about a particular vehicle on the lot, along with customized contact tools.

Figure 1:
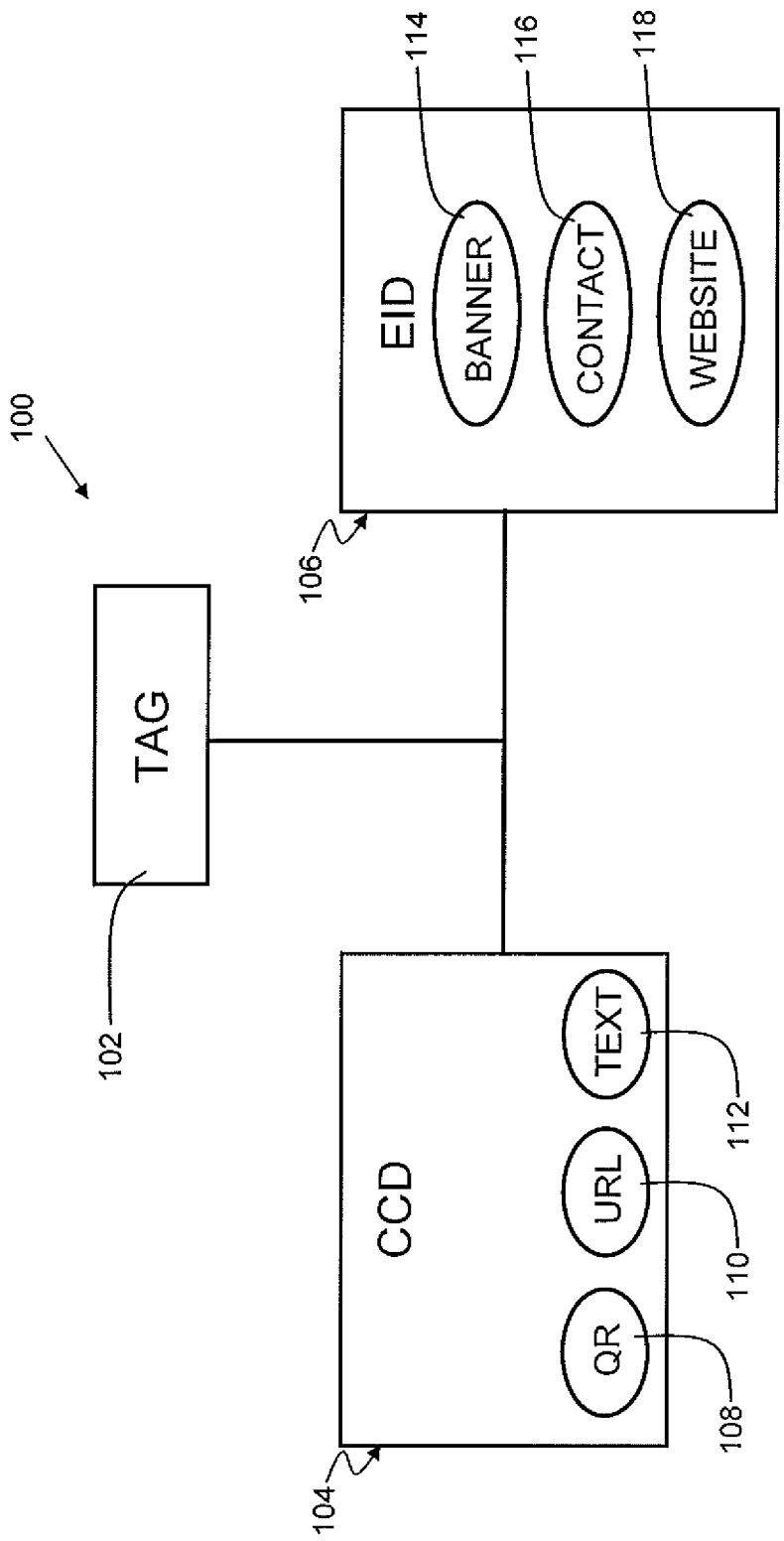
FIG. 1 shows a schematic representation of attributes which may be associated with a tag.

FIG. 1 shows a schematic representation 100 of attributes which may be associated with a tag. Tag 102 is associated with two major classes of attributes including CCD attributes, shown generally as 104 and Electronic Information Display (EID) attributes shown as 106. CCD attributes may be one or more of a QR code 108, a URL 110 (or short URL), and a keyword 112 (to be RMS, SMS or any other type of text-messaged to a particular telephone number). EID attributes may be one or more of an EID banner advertisement 114, contact information 116, and a webpage 118. Each attribute and method of selecting and editing are described in detail herein below. It will be recognized that more or fewer CCD or EID attributes may be implemented in practice, and the invention encompasses all such combinations.

Figure 2:
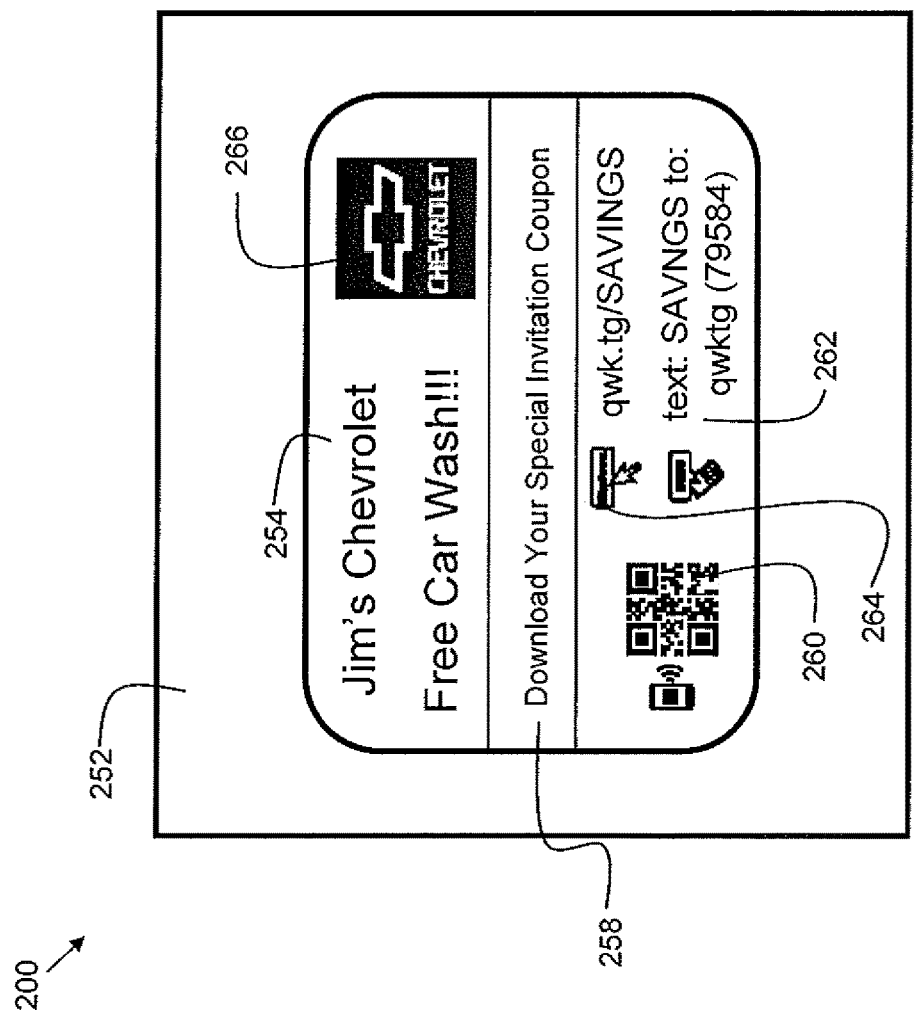
FIG. 2 depicts an example of a Consumer Content Display in accordance with the present invention.

FIG. 2 depicts an example 200 of a Consumer Content Display in accordance with the present invention. A CCD, such as 200, comprises a visual representation of CCD attributes (108, 110, or 112 of FIG. 1) associated with a particular tag. In practice, the CCD may typically contain one, some or all of the following additional features: CCD banner 254, an optional banner graphic 266, a message text area 258, a QR code 260, a URL 264, and text keyword 262. In the example of FIG. 2, the URL is qwk.tg/SAVINGS and the text keyword is SAVINGS.

In practice, a tangible copy 252 (i.e. printed on a substrate such as paper, cardstock, cardboard, plastic, etc.) of the CCD 200 is placed on or near an article for sale or of interest (such as a vehicle at an auto dealership), or an electronic copy is displayed via, for example, a website. It will be recognized, however, that the CCD 200 is not necessarily placed in proximity to the object it describes. For example, the CCD may be rendered in a magazine or sales flyer. In a real estate example, a magazine containing real estate listings may also have a CCD associated with each listing. In another example, the CCD may be on a poster such as a movie poster, to allow a customer to obtain information about an upcoming movie.

Typical CCD attributes comprise at least one of a QR code 108, a keyword 112 (and phone number or code) for text messaging, and a URL 110 (or short URL) by which a customer can retrieve additional information about an inventory item, such as a vehicle. A customer can use a device to scan QR code 260. This corresponds to a "scan" operation. It will be recognized that the term "QR code" is used herein generally to refer to any of a number of various protocols and standards, including, but not limited to, QR Codes, MS Tag, DataMatrix, Aztec, Trillcode, QuickMark, ShortCode, mCode, BeeTagg, and any other suitable tag, code or other technology, now known or hereafter developed. Therefore, the term "quick response code" or "QR code" is not limited to its traditional definition, but encompasses all types of code-like technologies. Alternatively, a customer may send a text message with a keyword 262 to a telephone number or short code. In this example, the user can send a text message containing the keyword "SAVINGS" to 79584 to retrieve additional information. This corresponds to a "text" operation. Alternatively, a customer may enter a URL 264 in a browser on a computer or mobile device to retrieve the desired information. In this example, the user can enter the URL: qwk.tag/SAVINGS to obtain the desired information. This capability allows customers who have access to a web browser, but may not have QR code scanning capability, to retrieve additional information.

Figure 3:
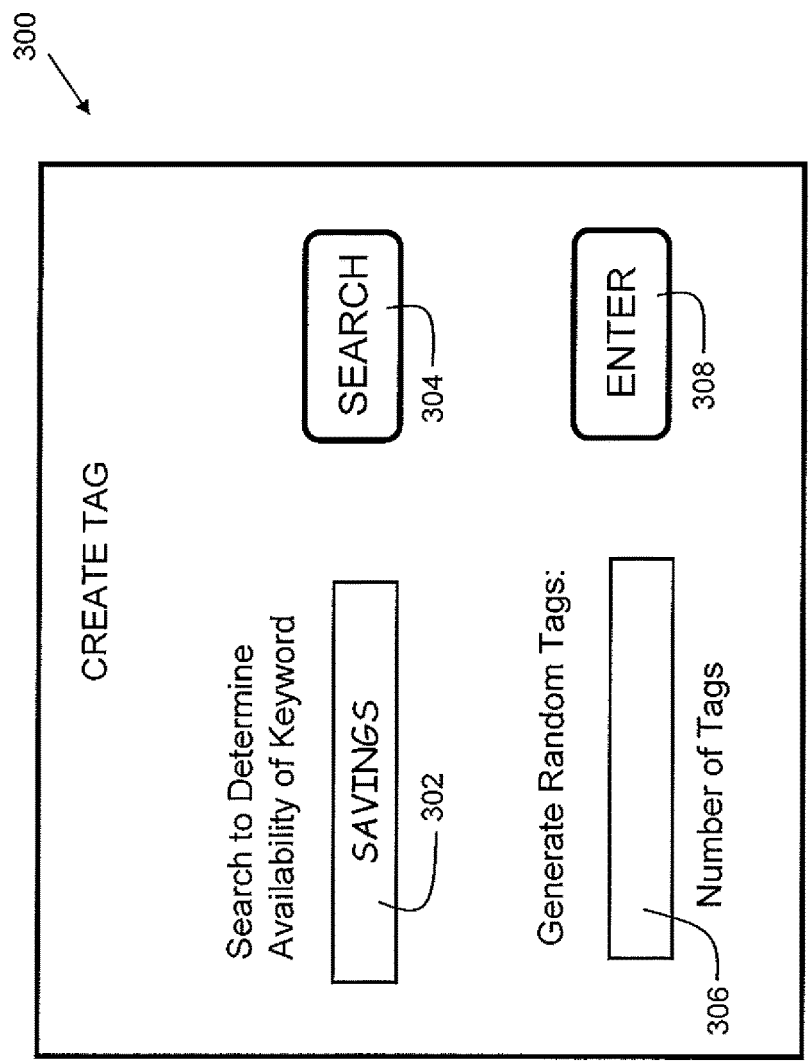
FIG. 3 shows an exemplary screen from which a user may select tags.

FIG. 3 shows an exemplary screen 300 from which a user may select tags. Tags may be selected by a user to correspond to a chosen alphanumeric set of characters (i.e. keyword) or be randomly generated by the system. In practice a user may choose to enter a keyword into search box 302 and click search button 304 to check if a particular keyword is available to be used as a tag. Otherwise, a user may choose to have tags randomly generated by the system by entering the number of tags to be generated into field 306 and selecting the enter button 308. It will be recognized that FIG. 3 is exemplary, and the scope of the invention includes other screens having similar features and other methodologies to achieve the same goal.

In some preferred embodiments, the system automatically sets the keyword (to be texted to a phone number) to match the tag, generates a Uniform Resource Locator (URL) having a path that matches the alphanumeric characters of the tag, and generates a QR code pointing to the generated URL. This URL may be a short URL of the form xxx.yy/path. The URL may point to a location on a content server (e.g., 2208 of FIG. 22), which, when entered into a browser, will serve an Electronic Information Display (EID), discussed in detail herein below, to the user's electronic device. The content on the content server that is referenced by the URL may be changed at any time. Hence, the tag is referred to as "pre-generated" since it may be generated before the content for a corresponding EID is known. This can be useful in situations where the CCD is printed (e.g. on postcards for bulk mailing) in advance of when the inventory is known. In the case of an automobile dealership, the inventory may not be known until just prior to putting the inventory on sale. However, with embodiments of the present invention, a CCD for a "special of the week" may be printed a priori, and later, when the inventory item is known, it is associated with the tag that is associated with that particular CCD.

Another example is as follows. A car dealership may establish a tag consisting of the characters: HONDA, for a particular automobile. The system would then set a keyword and a short code for retrieving information about the particular automobile, such as "Text HONDA to 12345." The URL path is then also set to "HONDA," such that there is a correspondence between the text keyword and the URL path in which the alphanumeric string that comprises the keyword is identical to the corresponding URL path. In this way, if the corresponding URL is shown along with the QR code on an automobile in a dealership lot, the keyword can be quickly inferred. Sending a text message to a short code is an alternative way to retrieve information when scanning the QR code is not possible or desired. A common scenario where this would apply is the case where a user has a phone that is text-capable, but does not have the QR scanning capability (e.g. a "feature phone"). In this way, a user with a feature phone can easily obtain a text form of the item descriptive information.

Figure 4:
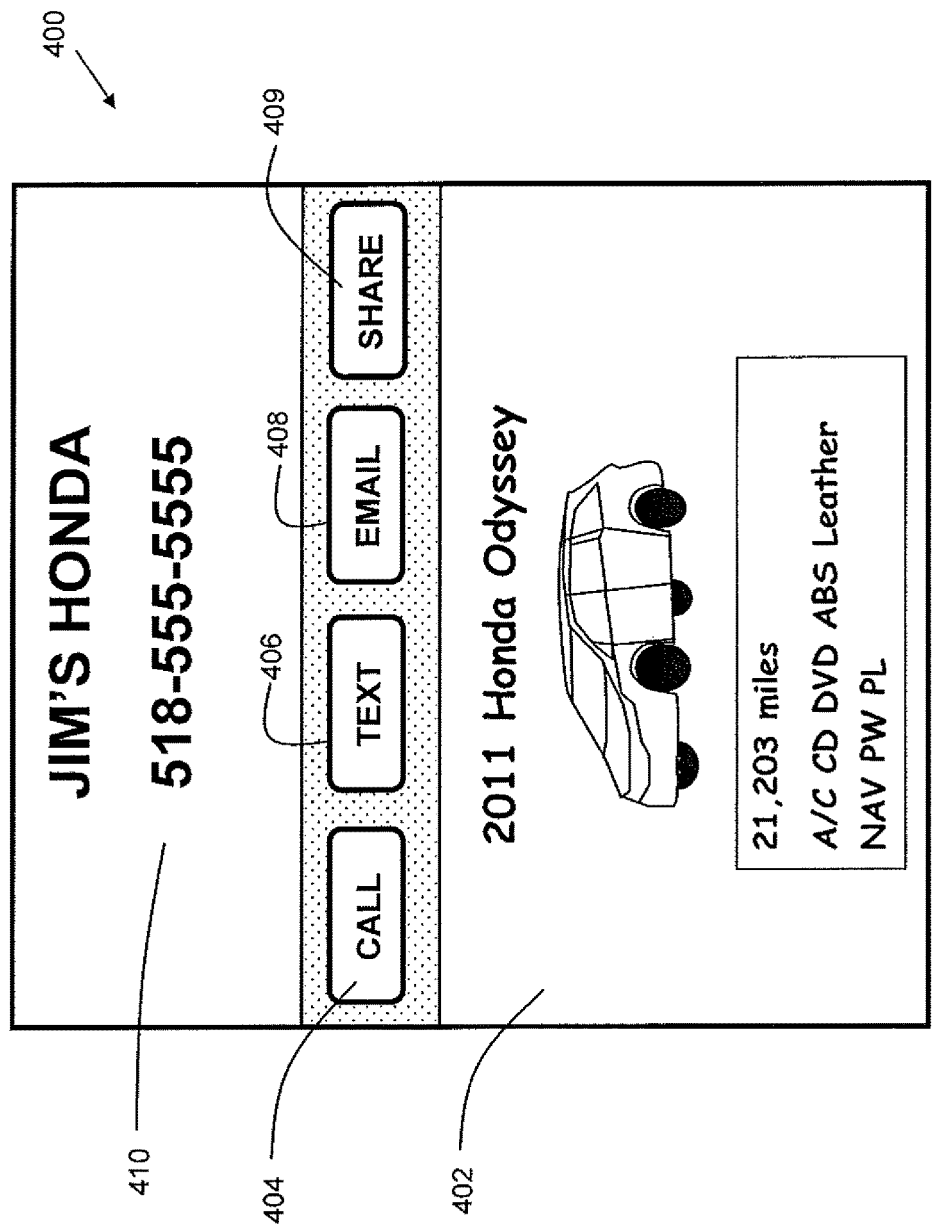
FIG. 4 shows an exemplary Electronic Information Display (EID).

FIG. 4 shows an exemplary Electronic Information Display (EID) 400, which is rendered on a customer's device when the customer scanned the QR code, entered the URL into a browser, or texted the keyword to the proper phone number, e.g., as specified on a Consumer Content Display. An EID, such as 400, is a visual representation of EID attributes (114, 116, and 118 of FIG. 1) associated with a particular tag. As shown on exemplary screen 400, the EID comprises an injection (by the inventive system) of at least one of an EID banner 410, one or more contact widgets (404, 406, 408, and 409) and webpage (item descriptive information) 402 onto the screen of the user's electronic device. Webpage 402 may be a website (external to the system) pointed to by a URL specified by the user—see FIG. 10, or an internal webpage (stored on the content server within the system, and customized by the user, FIG. 5), referred to herein as EID webpage.

The EID banner advertisement 410 may contain textual information and/or graphic, etc., and may further comprise a destination link to a URL when a user selects it (e.g., by clicking with a mouse or through tapping of a touch screen, etc.).

The contact widgets specify and/or provide access to an appropriate representative or department for the item. In the embodiment shown, four widgets are displayed: CALL 404, TEXT 406, EMAIL 408, and SHARE 409. The CALL widget 404 references a predetermined telephone number, and is configured to dial that telephone number upon selection by a user. The TEXT widget 406 references a predetermined text address (or phone number), and is configured to open a text message composing screen with that address upon selection by a user. The EMAIL widget 408 references a predetermined e-mail address, and is configured to open an e-mail message composing screen with that address upon selection by a user. The SHARE widget 409 may be used to share the information via e-mail or social networking, etc.

Figure 5:
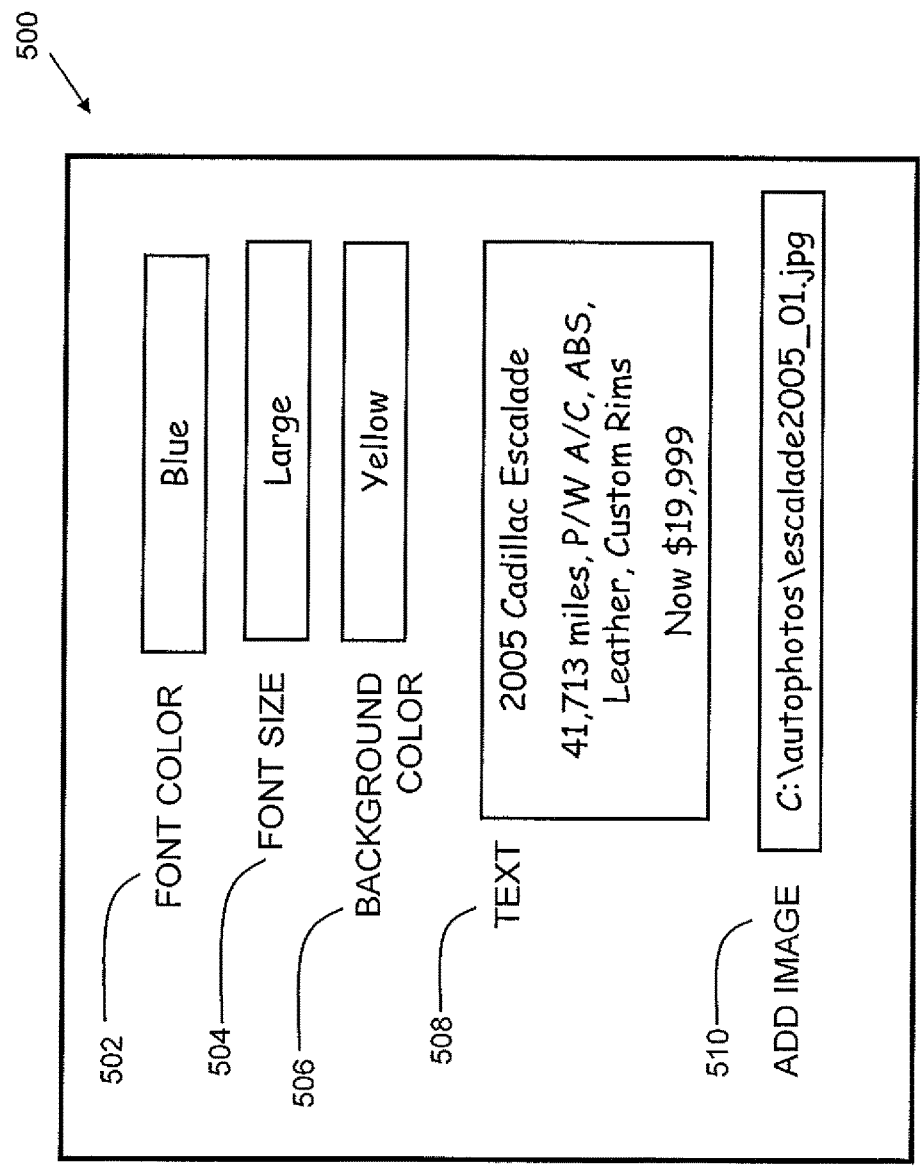
FIG. 5 shows an exemplary user interface for generating an internal webpage.

FIG. 5 shows an exemplary user interface 500 for generating an internal webpage (stored on the content server within the system). User interface 500 comprises font color selection control 502, font size selection control 504, background color 506, text field 508, and image upload field 510. It will be recognized that the user interface 500 is an example, and not meant to limit the disclosure. Any suitable user interface is included within the scope of the invention.

Figure 6:
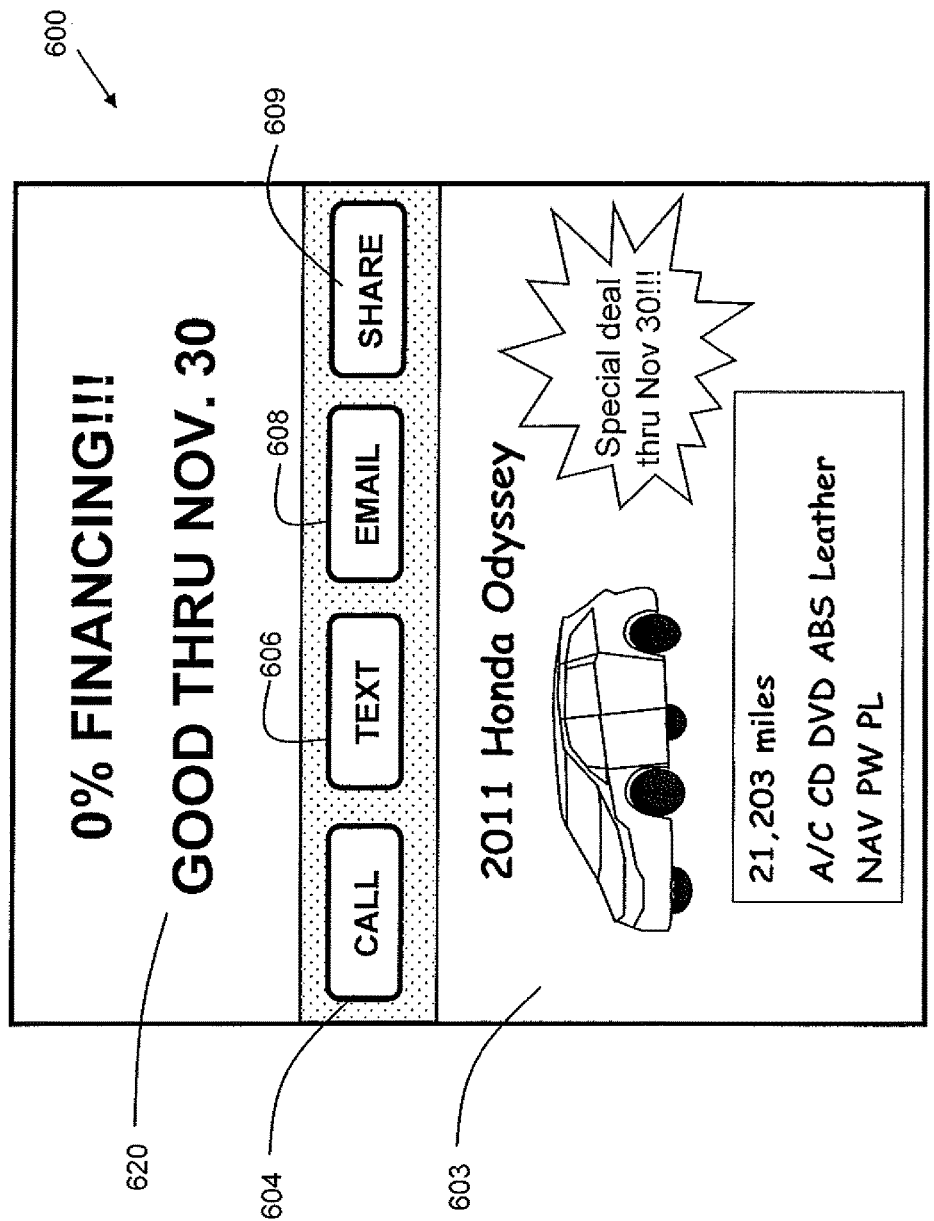
FIG. 6 shows an example of an exemplary EID having temporary attributes.

In some circumstances, it is desirable to temporarily change the EID attributes associated with a particular tag, and then revert back to original EID attributes when the promotion is over. FIG. 6 shows an example of an exemplary EID 600 having a temporary EID banner advertisement 620, contact widgets 604, 606, 608, and 609, and EID website 603. In this example, the offer in the temporary EID banner advertisement 620 expires on November 30. Hence, on December 1, it is desirable to revert back to the original (default) EID banner advertisement (410 of FIG. 4). Embodiments of the present invention enable easy management of EID attributes as further described herein below.

It will be recognized that although the interchangeable terms "banner" or "banner advertisement" are used herein, said terms encompass any type of display injected to an electronic device's screen in the manner described herein regardless of its shape. For example, instead of a banner, the advertisement, may be in the shape of a square, circle, triangle, etc. The word "advertisement" is also not meant to be limiting. The banner may contain any type of content, which may or may not be considered advertising, such as any informational, graphical, textual, or design content.

Figure 7:
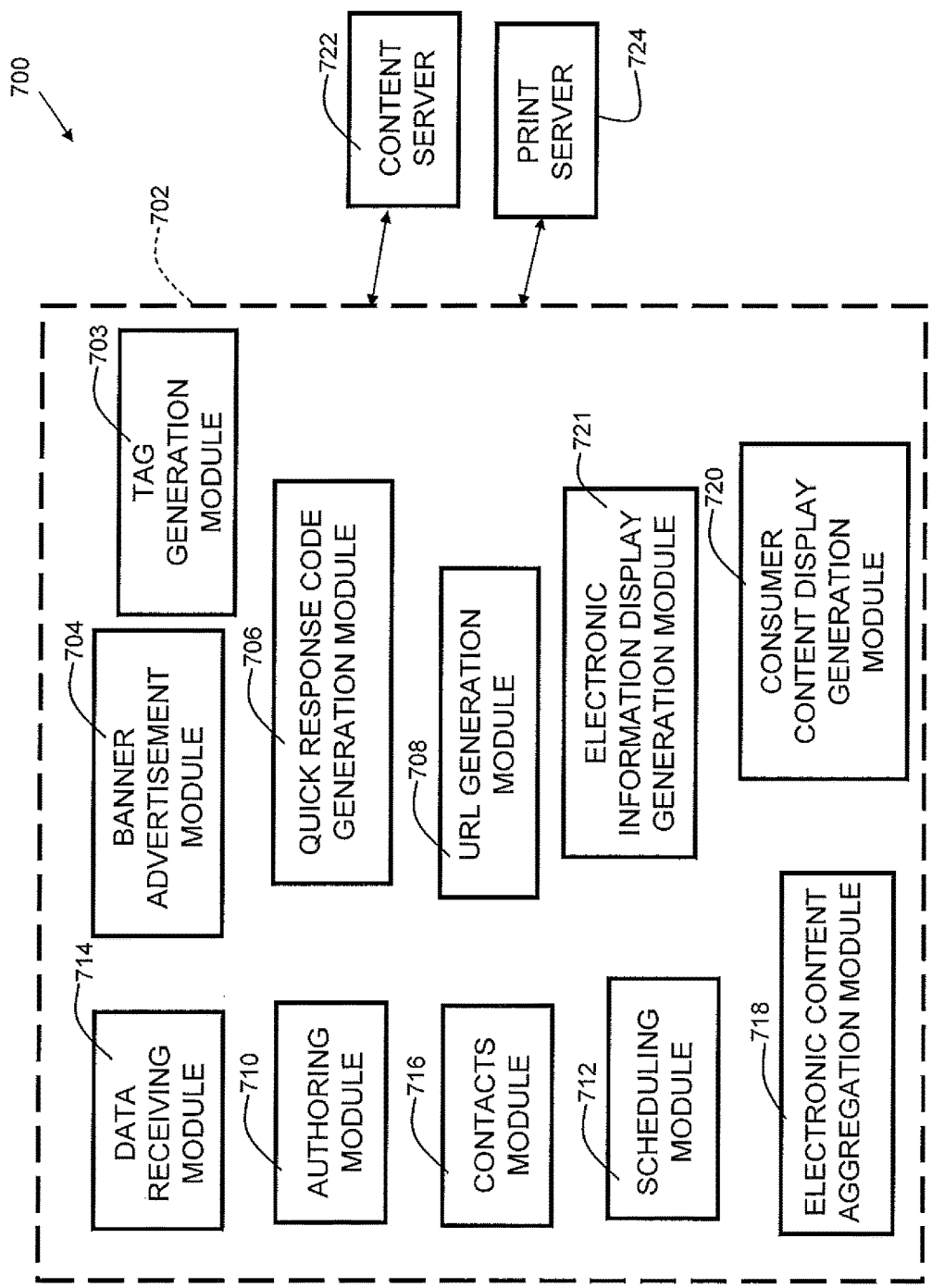
FIG. 7 is a system architecture diagram of a system in accordance with an embodiment of the present invention.

FIG. 7 is a system architecture diagram of a system 700 in accordance with an embodiment of the present invention. A computer 702 implements a plurality of modules which are embodied in machine instructions stored within a computer-readable storage medium (memory) of the computer 702. In some embodiments, the memory may be non-transitory. In some embodiments, the memory may be flash, ROM, SROM, or any other suitable memory/storage device. A tag generation module 703 generates tags. A banner advertisement module 704 selects EID banner advertisements for display in conjunction with content from an associated tag. A quick response code generation module 706 generates QR code graphic images. A URL (uniform resource locator) generation module 708 generates URLs which are associated with tags. Authoring module 710 provides a user interface for editing and managing tags, and enables a user to associate content (e.g. item descriptive information) with the generated URLs, and associate each generated quick response code with a corresponding generated URL. The scheduling module 712 controls the activation and deactivation of EID banner advertisements, contact widgets and EID websites. Data receiving module 714 optionally receives data to which tags are associated. This data represents multiple new inventory items, and may be in a comma-separated value (CSV) format or other machine-readable format. The data may contain information including, but not limited to, an item identification code, a description, a group identification code, a default banner advertisement, a temporary banner advertisement, a start date for the temporary banner advertisement, and an end (revert) date for the temporary banner advertisement.

The data is stored in the system and tags are assigned for each inventory item. A QR code is generated for each tag. A text message keyword and corresponding URL (or short URL) may also be generated. Contacts module 716 manages contact information (e.g. text, phone and e-mail information) pertaining to tags. An electronic content aggregation module 718 aggregates content from various sources, such as a website, banner text and/or banner graphics, and contact widgets. The aggregated content is represented as a web page injected onto a screen of an electronic device as an electronic information display (EID). A CCD generation module 720 renders an image that may contain a QR code from module 706, as well as additional information. A content server 722 stores aggregated content associated with each tag, including, without limitation, EID banner advertisements, contact information and an EID website. This information may then be input to electronic information display generation module 721 to generate an EID which is able to be rendered on an electronic device, such as a smart phone, tablet computer, or the like. A print server 724 may be used to enable automated generation of CCDs or QR codes for new inventory items.

Figure 8:
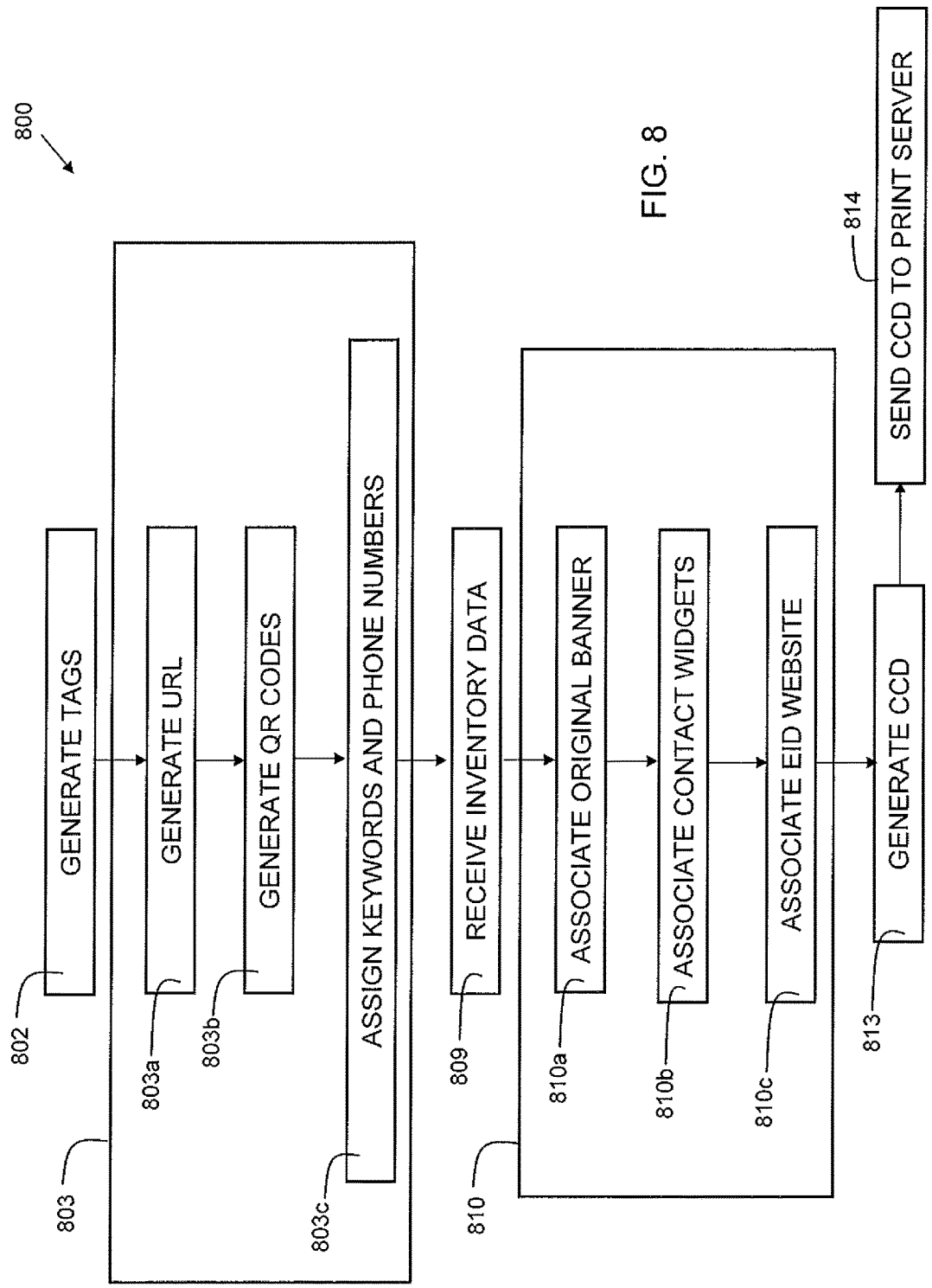
FIG. 8 is a flowchart indicating process steps for an embodiment of the present invention.

FIG. 8 is a flowchart 800 indicating process steps for an embodiment of the present invention. In process step 802, tags are generated (either from a user's selecting the alphanumeric characters, which will constitute the tag, or selecting an option to use pre-generated tags, i.e. tags randomly generated by the system). In this system, the tags may be "pre-generated" in that the tags may be established even before a user of the tags (e.g., a retailer) has had the opportunity to associate the tags to particular items of inventory (e.g., vehicles at an automobile dealership). The tags may be sequential alphanumeric identifiers. For example, HONDA01, HONDA02, HONDA03, etc. . . . . This is well suited for an application with multiple inventory items of a similar brand (e.g. multiple Honda automobiles). Alternatively, the tags may be randomly generated alphanumeric strings.

In process step 803, CCD attributes may be associated with the tag. Step 803 may comprise the following substeps. In substep 803a, a URL may be generated and the URL path may be set equivalent to the alphanumeric tag. This URL may be a short URL of the form xxx.yy/path, where the path is the same as the tag. For example, if the tag value is "MAZDA3" then the URL has the form xxx.yy/MAZDA3.

In process substep 803b, a QR code is generated and associated with each tag generated in step 802. In process sub step 803c, a keyword and phone number are assigned, so a person may text the keyword to the phone number in order to receive the EID on their device's screen.

In process step 809, inventory data is received. This data may be input manually for each inventory item into fields on various screens in the system, or in a composite form, such as CSV (comma separated value) file or other machine-readable format. In the case of an auto dealership, the inventory data may be received at a periodic interval (e.g. daily or weekly) and contain information about new inventory arriving on the dealership lot. The term "inventory" as used herein encompasses not only the traditional definition of goods, but also includes services, events and other non-tangible offerings, In process step 810, original (or "default") EID attributes are set. Process step 810 may comprise the following substeps. In substep 810a, an original (default) EID banner advertisement is associated with each tag. In process substep 810b, a contact tool (containing references to appropriate phone, text, and/or e-mail information, etc. for the widgets) is associated with each tag. The contact tool contains both the contact information (e.g. phone numbers, e-mail) as well as visual attributes (e.g. button styles, button colors, background colors, etc. . . . ). In process substep 810c, a URL pointing to a desired EID website is set. The website may be an external website, or an internal website residing on a server (e.g. 2208 of FIG. 22) that is part of the system.

Figure 10:
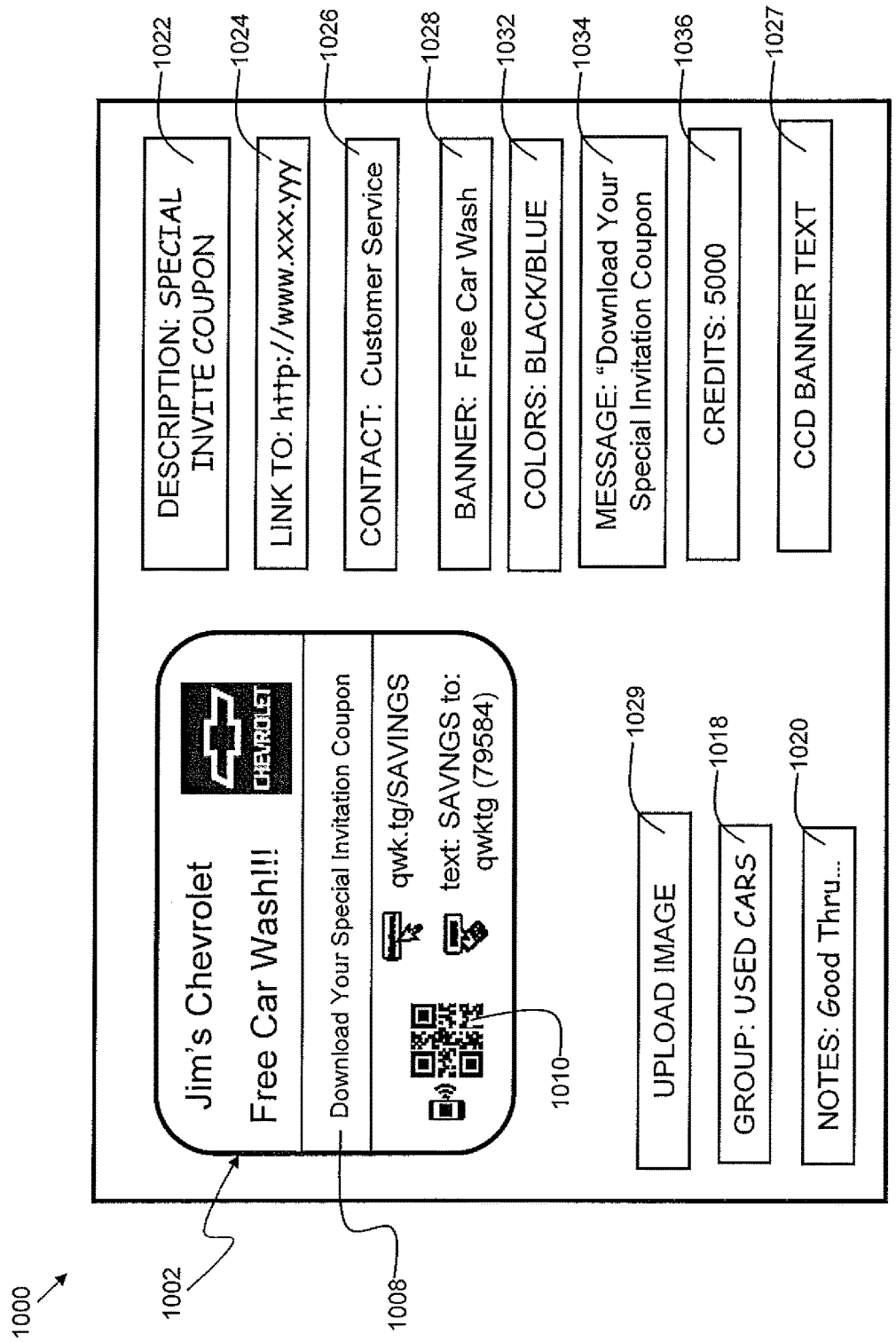
FIG. 10 shows an exemplary user interface for authoring content for a Consumer Content Display.

In process step 813, a CCD is generated (see 1002 of FIG. 10). The CCD may be used in electronic form (such as displayed via a website, or in tangible form by process step 814, in which the CCD is sent to a print server. The print server may then automatically, or on demand, print CCDs for each of the inventory items (e.g. newly arrived vehicles on a dealership lot). This feature potentially saves considerable time in handling the arrival of new inventory, since the new CCDs are printed in a single operation, rather than having to individually identify each CCD that needs to be printed. In one embodiment, the print server may be contained within the printer device itself. In an alternative embodiment, for process step 814, each CCD is sent directly to a printer, with no print server present. In the case of an auto dealership, a customized CCD may be positioned on a window of each vehicle at the dealership, so that customers may access additional information about each vehicle.

It will be recognized that the order of steps 802-814 is not limited to that described herein, but instead, any feasible order of such steps is included within the scope of the invention. For example, in some embodiments, step 809 of receiving inventory data may be performed first, and then step 802 of generating tags may be performed. In one embodiment, the tags generated by step 802 may be based on an inventory data item from the data received in step 809. For example, the received inventory data may contain an item number, and the corresponding alphanumeric tag may be set to the item number. Alternatively, the alphanumeric tag may be set, in part, to an item description field. For example, if the item description field is "Honda Accord LX-2009" then the alphanumeric tag may take the first word of the description, and then append a numeric string (e.g. "213") to form the complete tag (e.g. "HONDA213"). It will also be recognized that more or fewer steps may be implemented, and all such combinations are included within the scope of the invention.

Figure 9:
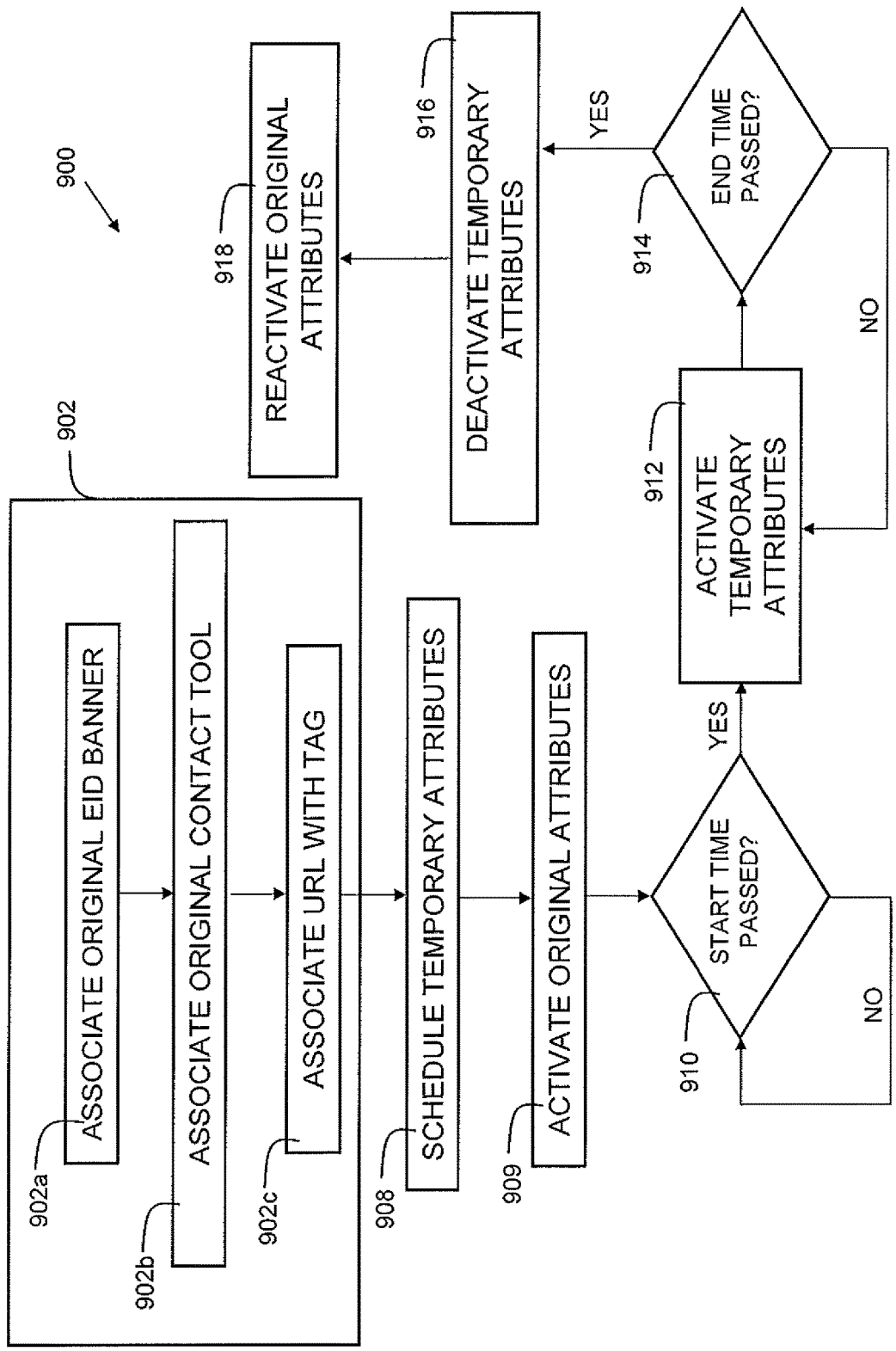
FIG. 9 is another flowchart indicating process steps for an embodiment of the present invention.

FIG. 9 is a flowchart 900 indicating process steps for an embodiment of the present invention. In process step 902, original EID attributes are associated with a tag. Step 902 may comprise the following substeps. In substep 902a, an original EID banner advertisement is associated with a tag. In substep 902b, an original contact tool is associated with a tag. The contact tool contains contact widgets having information about who/how to contact to get further information regarding the product or service referenced by the tag. In substep 902c, a URL pointing to an external website or a custom-generated page within the inventive system, is associated with a tag ("EID website"). The EID website may contain, for example, item descriptive information for the particular inventory item. In process step 908, one or more temporary EID attributes, which may include a temporary EID banner advertisement, temporary contact information or a temporary EID website, is associated to the particular tag and scheduled by establishing a start and end time for the one or more temporary attributes, such as a temporary banner advertisement, contact information and/or EID website. In process step 909, the original attributes (EID banner, contact information and/or EID website) are activated. In process step 910, a check is made to determine if the start date (and possibly time) for the temporary attribute(s) has passed. If so, the temporary attributes are activated in process step 912. In process step 914, a check is made to determine if the end (revert) date for the temporary attribute(s) has passed (so that the system may deactivate the temporary EID banner advertisement, contact information, or EID website with each tag when the current date equals the end date). If so, the temporary attribute(s) (EID banner, contact information or EID website) is deactivated in process step 916, and the default attribute (EID banner advertisement, contact information and/or EID website) is reactivated in process step 918. It will be recognized that the order of steps 902-918 is not limited to that described herein, but instead, any feasible order of such steps is included within the scope of the invention. It will also be recognized that more or fewer steps may be implemented in practice, and all combinations are included within the scope of the invention.

FIG. 10 shows an exemplary user interface 1000 for effectively authoring content for a Consumer Content Display 200 (see FIG. 2), and setting the corresponding EID attributes. User interface 1000 includes a preview 1002 of the CCD. User interface 1000 may contain several data fields for input of information by a user. For ease of understanding and not by way of limitation, data fields may be categorized as one or more of organizational, EID-related and CCD-related.

Organizational fields may comprise the following. Data field 1018 shows the group to which QR code 1010 belongs (grouping of QR codes is discussed further herein below). A data field 1020 may optionally be provided for a user to enter notes, if any, pertaining to the CCD. Data field 1022 shows a description for the CCD. Typically, the information in the organizational fields are for user reference only, and therefore, only available to the user and not shown on a CCD.

EID settings fields may comprise the following. Data field 1028 shows an identifier for the EID banner advertisement (see e.g., 1202 of FIG. 12) corresponding to the CCD. Data field 1026 shows an identifier of the contact tool (see e.g., 1102 of FIG. 11) corresponding to the tag. Data field 1024 shows a destination link to which the EID website (e.g. 402 of FIG. 4) may point.

CCD settings fields may comprise the following. Data field 1027 allows a user to enter text for display as the CCD banner, or data field 1029 allows a user to upload an image to serve as the CCD banner. Data field 1032 shows the colors used in the CCD 1002. Data field 1034 shows the message text that appears in the message text area 1008.

It will be recognized that the data fields shown in FIG. 10 are exemplary, and the invention encompasses a user interface 1000 having more or fewer data fields, and in different configurations.

In some embodiments of the invention, a tag management organization may establish user accounts with a predetermined number of credits. Each customer interaction (scan, click, or text) may cost a predetermined number of credits. In one embodiment, each scan, click, or text costs one credit. Hence, every time a customer scans, clicks, or texts to retrieve information, a user account is charged for a credit. Users may purchase a plan to buy a fixed number of credits per month (or other time period). Users may purchase additional credits prior to the next time period if they run out. Data field 1036 shows the number of credits for the account to which the tag belongs.

Figure 11:
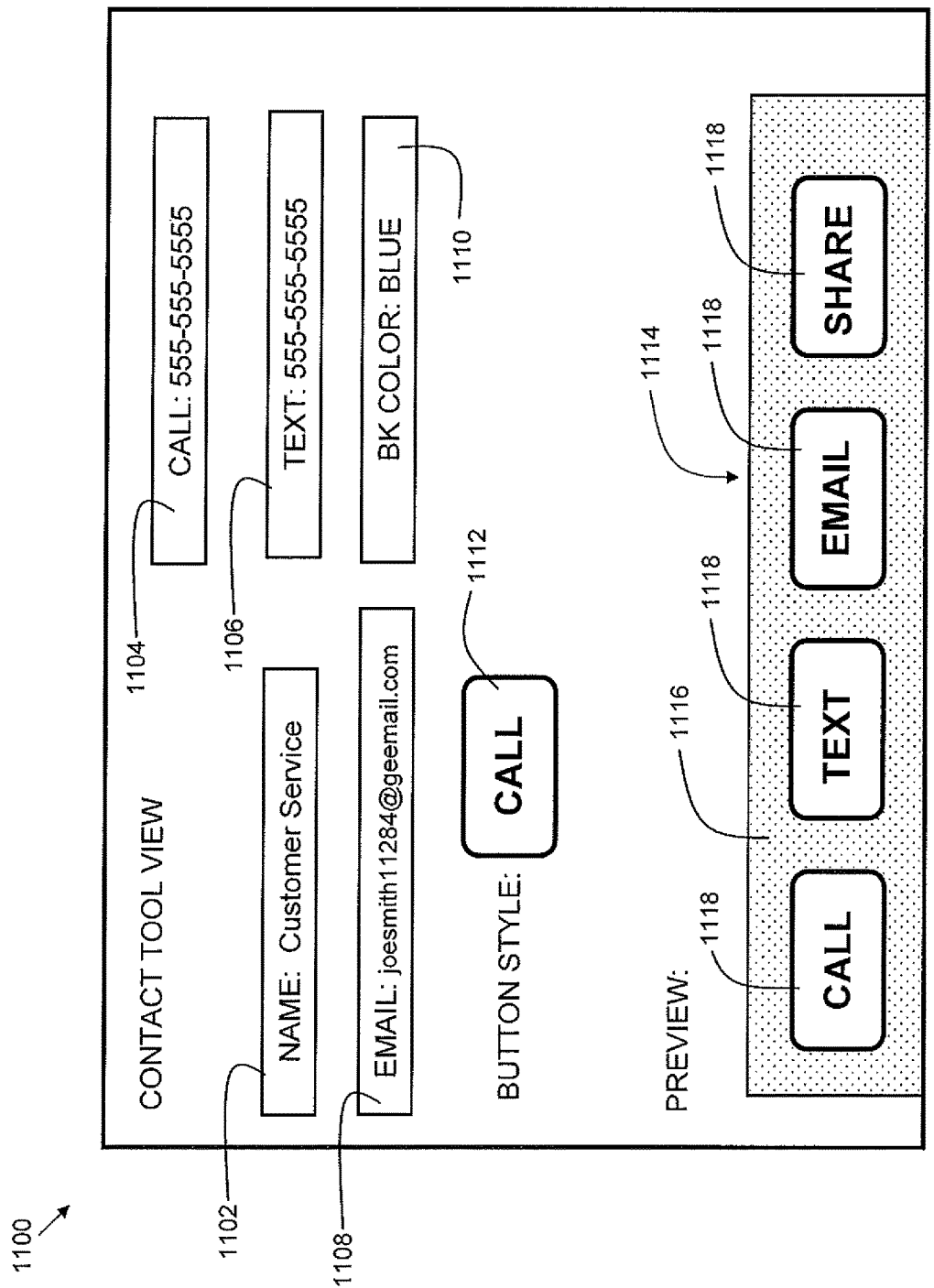
FIG. 11 shows an exemplary user interface for authoring contact tools, which comprise one or more contact widgets.

FIG. 11 shows an exemplary user interface 1100 for authoring contact tools, which comprise one or more contact widgets. Data field 1102 shows the identifier (i.e. name) of the contact tool data set. This name can be entered into data field 1026 (FIG. 10) to set contact information for a particular CCD quickly and easily. Data field 1104 is for the contact telephone number. Data field 1106 is for the contact text number. Data field 1108 is for the contact e-mail address. Data field 1110 is for the contact widget background color. Button 1112 is for the button style for the contact widgets. Upon clicking or otherwise selecting the button, a user can select a button style from, for example, a pop-up menu of choices (not shown). A preview of contact widget set 1114 is also rendered on user interface 1100. The preview shows how the contact tool (set of contact widgets) will appear to a customer, and indicates the background color 1116 and the position and text of each contact widget 1118.

Figure 12:
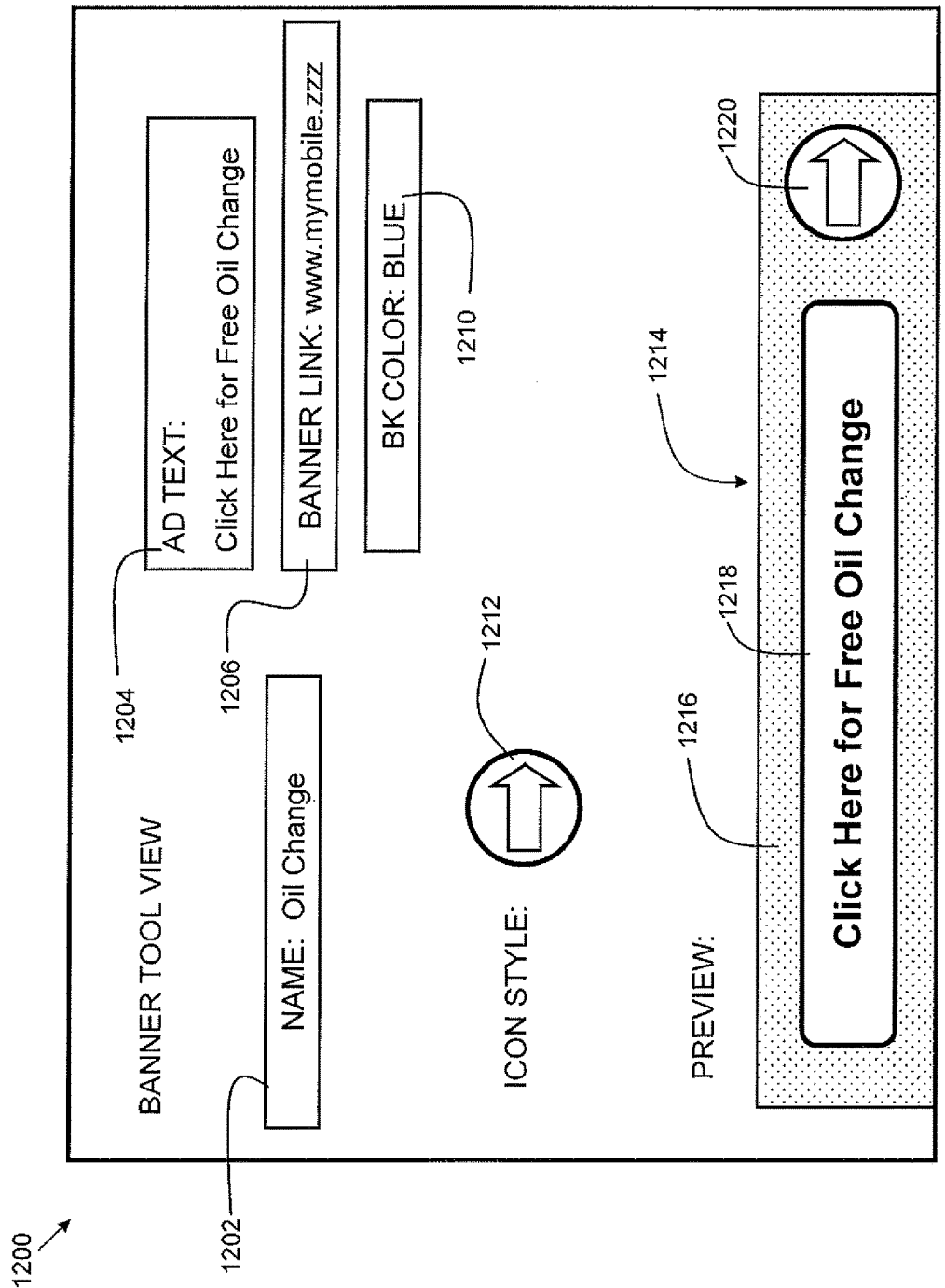
FIG. 12 shows an exemplary user interface for authoring EID banner information.

FIG. 12 shows an exemplary user interface 1200 for authoring EID banner information. Data field 1202 shows the identifier (or name) of the EID banner ad. Data field 1204 is for a user to enter text to appear in the EID banner ad. Data field 1206 is a destination link to which the banner ad will direct a device upon a user clicking/tapping on, or otherwise selecting, the EID banner ad. Data field 1210 is for the banner background color. Data field 1212 is for an icon style for use with the EID banner. Upon clicking or otherwise selecting the icon, a user can select an icon type from, for example, a pop-up menu of choices. A preview 1214 of the EID banner ad is also rendered on user interface 1200. The preview shows how the banner ad will appear to a customer, and indicates the background color 1216, banner message 1218, and banner icon 1220.

FIG. 13 shows an EID banner ad summary screen 1300. Data field 1312 shows the name of the banner ad. Data field 1314 shows the type of banner ad (text only or image-based). Data field 1318 shows the URL to the EID website with which the banner ad is injected as an EID. Data field 1322 contains an icon that is selectable (e.g. via clicking with a mouse or tapping a touch screen) to invoke functions for viewing a banner ad in a preview. Data field 1324 contains an icon that is selectable (e.g. via clicking with a mouse or tapping a touch screen) to invoke functions for deleting a banner ad.

FIG. 14 shows a contact tools summary screen 1400. Data field 1412 shows the identifier (i.e. name) of the contact tool. A contact tool is comprised of one or more contact widgets (e.g. for calling, sharing, texting, or e-mailing to obtain more information about the item of inventory to which a CCD pertains). Data field 1414 shows the button style of the contact widgets used in the contact tool. Data field 1416 shows the background color used in the contact tool. Data field 1418 shows the phone number associated with the call widget associated with the contact tool. Data field 1420 shows the phone number associated with the text widget associated with the contact tool. Data field 1422 shows the e-mail address associated with the email widget associated with the contact tool. Data field 1424 contains an icon that is selectable (e.g. via clicking with a mouse or tapping a touch screen) to invoke functions for viewing a contact tool in a preview. Data field 1426 contains an icon that is selectable (e.g. via clicking with a mouse or tapping a touch screen) to invoke functions for deleting a contact tool.

It will be recognized that the data fields shown in FIGS. 11-14 are exemplary, and in practice, may contain fewer, more and/or different fields. It will also be recognized that the data fields may be placed in different configurations on the user interface. All combinations are included within the scope of the invention.

Grouping

Inventory items often have logical groupings, and hence, it is desirable to manage tags by group. For example, in the case of automobiles, a dealership may often carry cars from multiple manufacturers. One manufacturer may offer a promotion (e.g., financing specials or other incentives) while others may not. With embodiments of the present invention, a user can establish a tag group (e.g., "Certified Pre-owned Hondas") and then perform a group edit, whereby the edited attribute(s) on every tag in that group are changed in a single operation. This can provide considerable time savings when the number of inventory items is large. For example, if a car dealership has 50 certified pre-owned Hondas in current inventory entered into the same group within the inventive system, and needs to change the default EID banner advertisement to a promotional EID advertisement, the group edit feature of embodiments of the present invention allows the EID banner advertisement change to be applied to the tag associated with each of the certified pre-owned Hondas in a single operation, rather than needing to perform the operation separately for 50 individual tags. Other attributes, such as the contact tool (widgets—604, 606, 608, and 609), can also be changed for a group. The contact tool may be changed along with the temporary EID banner ad, and then reverted to the original contact widgets when the original EID banner ad is restored. This may be useful when the promotion provided by the temporary banner warrants different contact personnel. In other cases, the contact widgets may change independently from an EID banner (and vice versa) as, for example, new employees join an organization. If a new salesperson replaces a previous salesperson, the phone, text, and e-mail information can be updated by group. It will also be recognized that the EID website injected to the EID may also change along with one or both of contact tools and an EID banner, or independently.

Figure 15:
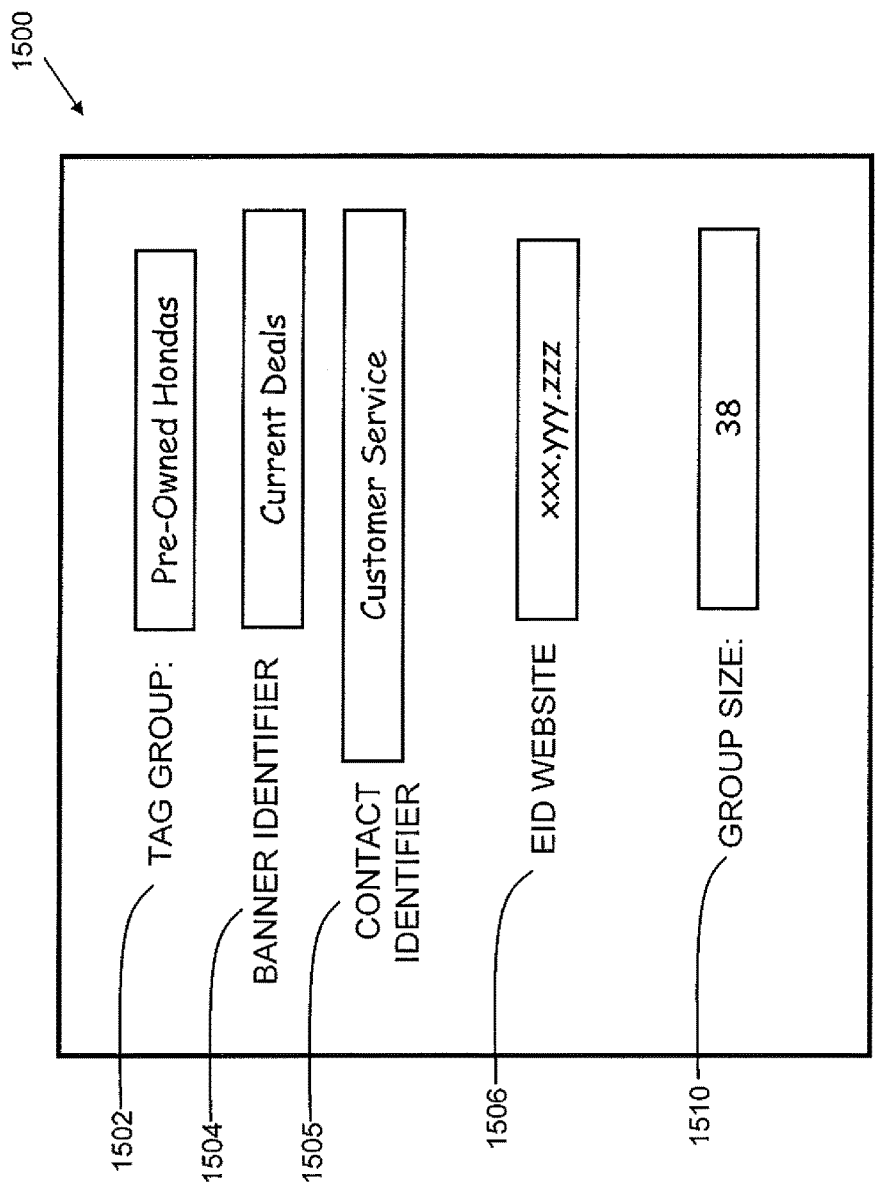
FIG. 15 is an exemplary user interface for performing a group edit.

FIG. 15 is an exemplary user interface 1500 for performing a group edit. This functionality allows a user to change attributes for multiple tags at once, rather than have to access a screen, e.g., FIG. 10, for each particular tag. User interface 1500 shows a plurality of fields used in the group edit. Field 1502 lists a group identifier (i.e. group name). Field 1504 allows a user to enter in an identifier for a EID banner ad to be injected as part of an EID to a screen of an electronic device upon a tag being queried (like 1028 of FIG. 10). Field 1505 allows a user to enter in a contact identifier representing contact widgets to be injected as part of the EID (like 1026 of FIG. 10). Field 1506 indicates a URL pointing to a EID website to be injected as part of the EID (like 1024 of FIG. 10). Considering a case where a user wants to change the EID banner ad for all codes in the group, "Pre-owned Hondas," the banner field 1504 can be edited to refer the EID to a new banner ad identifier, and that change applied to all 38 tags in the "Pre-owned Hondas" group in a single operation. Hence, by associating an identical set of electronic information display attributes (e.g., a banner) to each tag in a single operation, there is a considerable time savings as compared with having to edit each of the 38 tags individually. Field 1510 indicates the number of tags in the group. In this example, the group pertains to Pre-owned Hondas. It will also be recognized that in some embodiments, more or fewer fields may be presented, and all such combinations are included within the scope of the invention.

Figure 16:
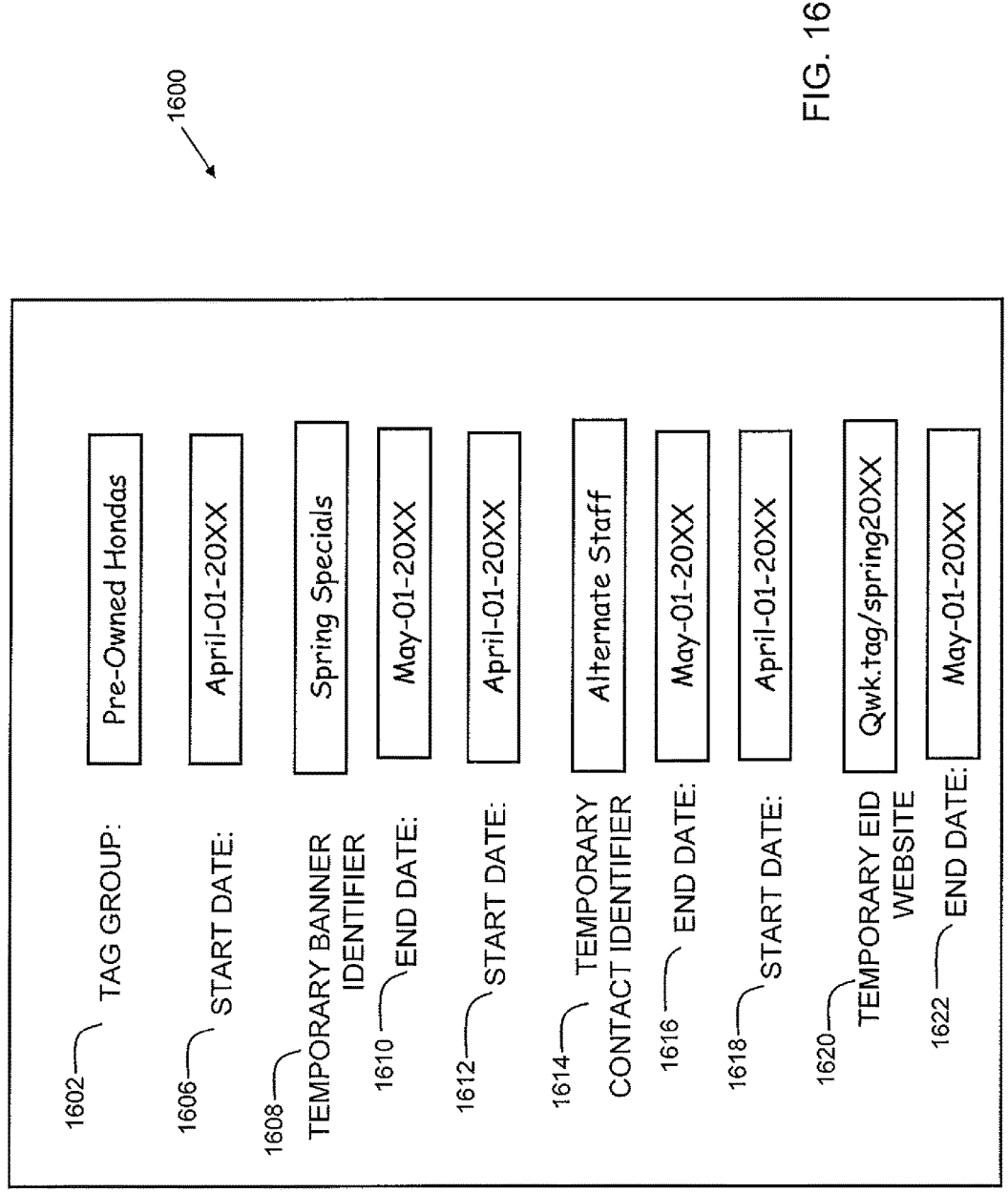
FIG. 16 is an exemplary user interface for performing a group scheduling operation.

FIG. 16 is an exemplary user interface 1600 for performing a group scheduling operation (see step 908 of FIG. 9). Field 1602 lists a group identifier (i.e. group name). Field 1606 indicates a start date for activating a temporary banner advertisement. Field 1608 indicates the identifier of an EID banner ad for a temporary EID banner advertisement. Field 1610 indicates an end date for deactivating the temporary EID banner advertisement and reverting back to the original EID banner advertisement. Field 1612 indicates a start date for activating a temporary contact tool. Field 1614 indicates the identifier of a contact tool to be used as a temporary contact tool. Field 1616 indicates an end date for deactivating the temporary contact tool and reverting back to the original contact tool. Field 1618 indicates a start date for activating a temporary EID website. Field 1620 indicates the URL for a temporary EID website. Field 1622 indicates an end date for deactivating the temporary URL and reverting back to the original URL. Embodiments of the present invention allow the schedule to be established prior to the start date. Some or all of the fields may be scheduled at once. In this way, it is not necessary to make the change on the actual start date. In this example, the start date for the temporary banner advertisement is April 01, and the revert (end) date is May 01. However, the schedule may be established in advance of April 01. By providing the ability to schedule temporary EID attributes in advance of the dates specified in the start date fields 1606, 1612, and 1618 and revert (end) date field 1610, 1616 and 1622, the management of promotional EID attributes associated with tags is considerably simplified.

Figure 17:
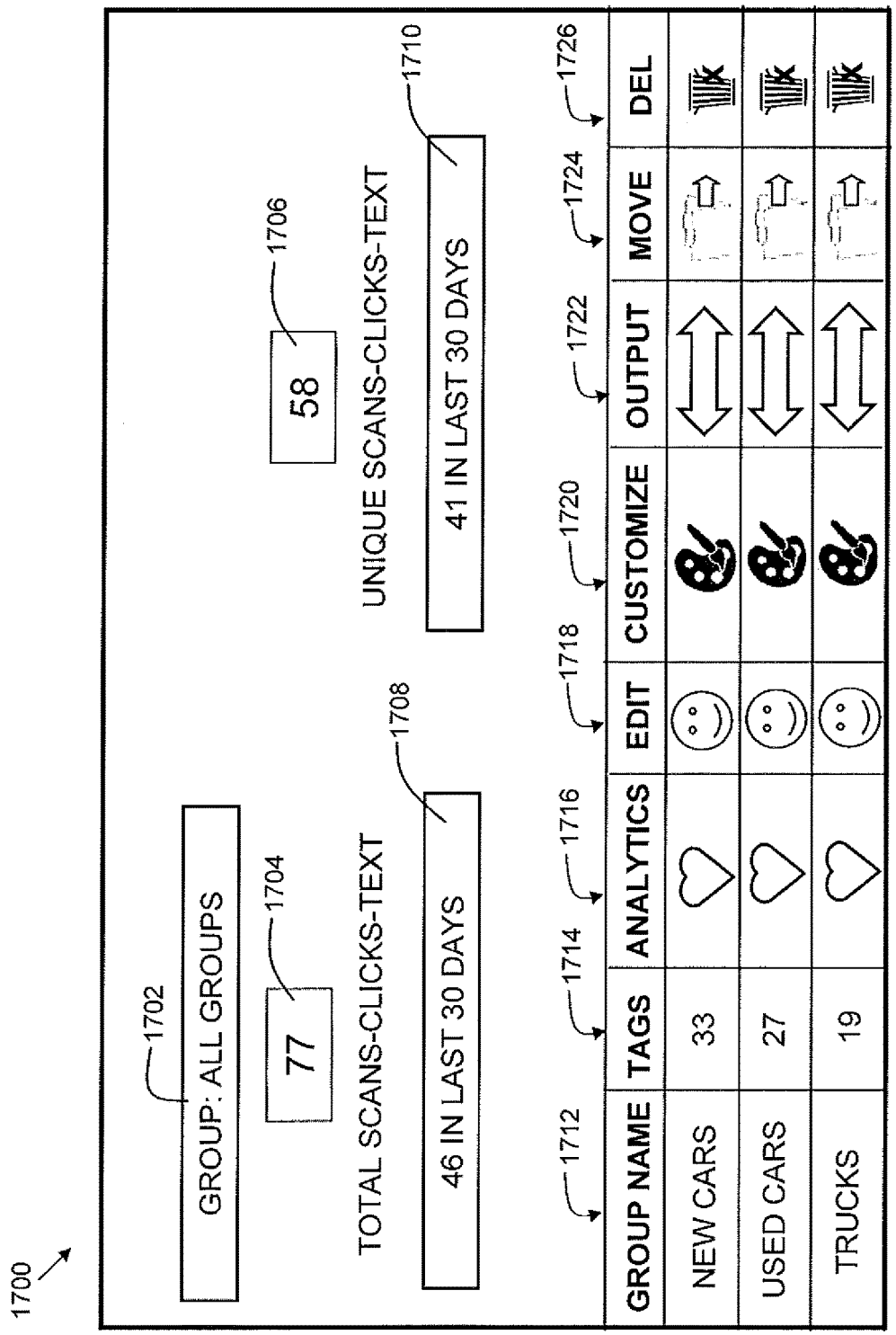
FIG. 17 shows an exemplary user interface for displaying information regarding multiple groups of tags.

FIG. 17 shows an exemplary user interface 1700 for displaying information regarding multiple groups of tags. Data field 1702 displays the group setting. This indicates which group or groups are currently displayed. In this case, information regarding all groups of tags associated with the particular user account is displayed. Data field 1704 shows the SCT count, which is the total number of scans, clicks, or texts for all the tags—i.e. scans, clicks, and texts of the contact tools associated with the tags. A "scan" is an instance of a user obtaining information by scanning a QR code with a mobile device. A "click" is an instance of a user obtaining information by entering a URL in a computer or mobile device. A "text" is an instance of a user obtaining information by sending a text message containing a keyword to a telephone number or short code. Data field 1706 shows the USCT count, which is the number of unique scans, clicks, or texts. This is a measure of how many different users performed an SCT operation on the tags. For example, the USCT count does not reflect instances where the same user scans a code multiple times, whereas the SCT count increments for every scan, click, or text of contact tools associated with a tag.

Data field 1708 shows a textual representation of the SCT count acquired during a predetermined time interval. In this example, the predetermined time interval is the last 30 days. Data field 1710 shows the USCT count acquired during a predetermined time interval. In this example, the predetermined time interval is again the last 30 days. It will be recognized that the time interval of 30 days is chosen for the purpose of disclosure, and that other predetermined time intervals are also included within the scope of the invention.

Data field 1712 shows the group identifier (i.e. name) for the multiple groups. It can be convenient for a user to organize tags into groups depending on the nature of the product or service they refer to. In this example, the following groups are shown: New Cars, Used Cars, and Trucks. Data field 1714 shows how many tags belong to each group. For example, the New Cars group has 33 tags in it. Data field 1716 contains an icon that is selectable (e.g. via clicking with a mouse or tapping a touch screen) to invoke additional information (analytics) about a particular group. Data field 1718 contains an icon that is selectable (e.g. via clicking with a mouse or tapping a touch screen) to invoke editing functions for a particular group. This may allow a user to change certain attributes of the group, such as a URL used for the EID banner ads, contact information, and the like. Data field 1720 contains an icon that is selectable (e.g. via clicking with a mouse or tapping a touch screen) to invoke customization functions for a particular group. This may allow a user to change certain attributes of the group, such as background colors for the consumer content display associated with that group. Data field 1722 contains an icon that is selectable (e.g. via clicking with a mouse or tapping a touch screen) to invoke output functions for a particular group. This may allow a user to publish changes. Data field 1724 contains an icon that is selectable (e.g. via clicking with a mouse or tapping a touch screen) to invoke a group move function. This may allow a user to move one or more tags from one group to another group. Data field 1726 contains an icon that is selectable (e.g. via clicking with a mouse or tapping a touch screen) to invoke delete functions for a particular group. This may allow a user to delete a group.

Figure 18:
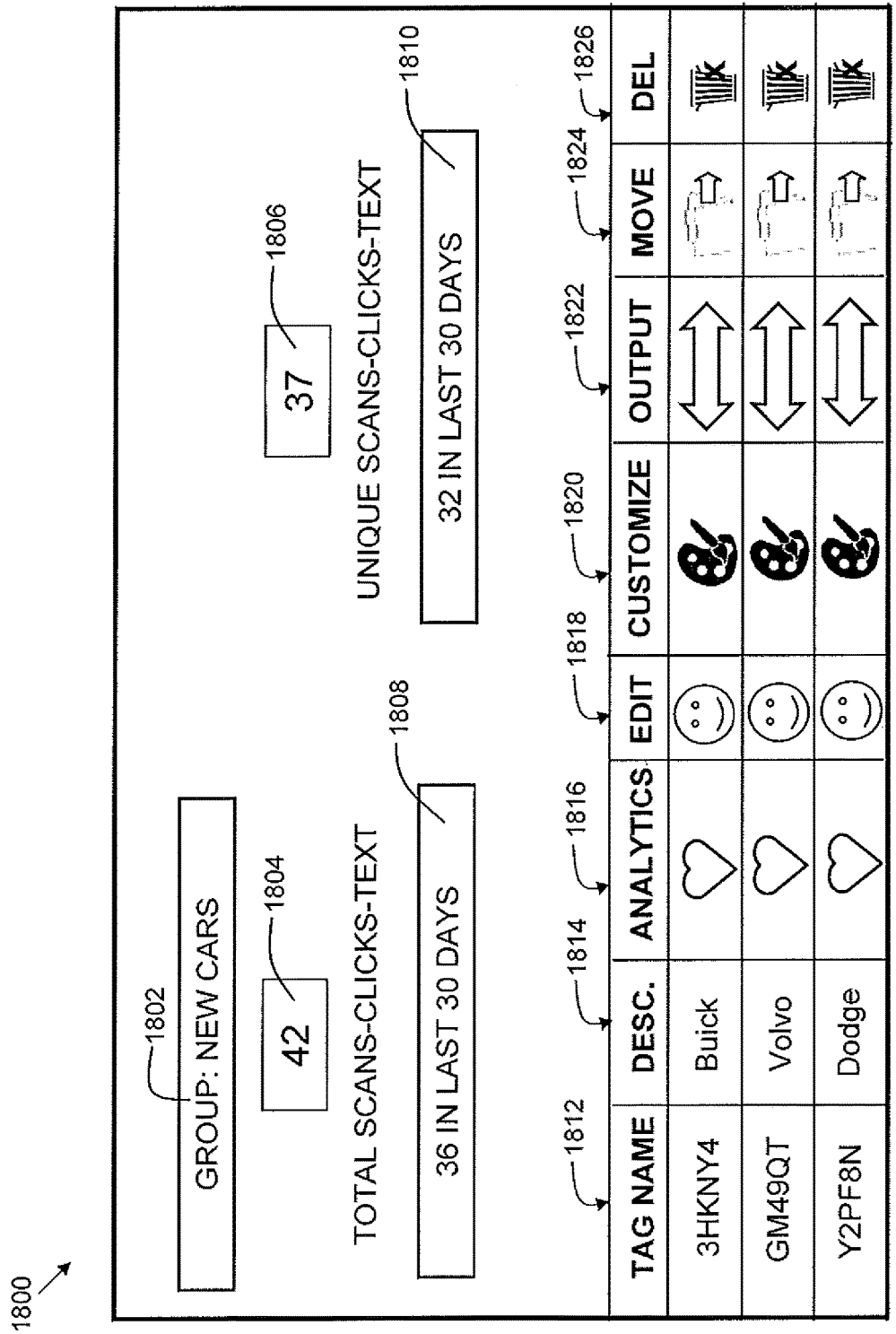
FIG. 18 shows an exemplary user interface for displaying information regarding a particular group of tags.

FIG. 18 shows an exemplary user interface 1800 for displaying information regarding a particular group of tags. Data field 1802 displays the group setting. This indicates which group of tags is currently displayed. In this case, information regarding the New Cars group of tags is displayed. Data field 1804 shows the SCT count for this group. Data field 1806 shows the USCT count for this group.

Data field 1808 shows a textual representation of the group SCT count acquired during a predetermined time interval. In this example, the predetermined time interval is the last 30 days. Data field 1810 indicates the group USCT count acquired during a predetermined time interval. In this example, the predetermined time interval is again the last 30 days. Other predetermined time intervals are possible. It will be recognized that the time interval of 30 days is chosen for the purpose of disclosure, and that other predetermined time intervals are possible and included within the scope of the invention.

Data field 1812 shows a tag identifier (i.e. name) for each alphanumeric tag within the group indicated in data field 1802. Data field 1814 shows a description for each tag. Data field 1816 contains an icon that is selectable (e.g. via clicking with a mouse or tapping a touch screen) to invoke additional information (analytics) about a particular tag. Data field 1818 contains an icon that is selectable (e.g. via clicking with a mouse or tapping a touch screen) to invoke editing functions for a particular tag. This may allow a user to change certain attributes of the tag, such as a URL used for the banner ads, contact information, and the like. Data field 1820 contains an icon that is selectable (e.g. via clicking with a mouse or tapping a touch screen) to invoke customization functions for the consumer content display associated with a particular tag. This may allow a user to change certain attributes of the consumer content display, such as background colors for the consumer content display. Data field 1822 contains an icon that is selectable (e.g. via clicking with a mouse or tapping a touch screen) to invoke output functions for a particular tag. This may allow a user to publish changes so that they take effect upon a subsequent user action of scan, click, or text. Data field 1824 contains an icon that is selectable (e.g. via clicking with a mouse or tapping a touch screen) to invoke a group move function. This may allow a user to move a tag from one group to another group. Data field 1826 contains an icon that is selectable (e.g. via clicking with a mouse or tapping a touch screen) to invoke delete functions for a particular group. This may allow a user to delete certain tags from the group indicated in data field 1802.

Figure 19:
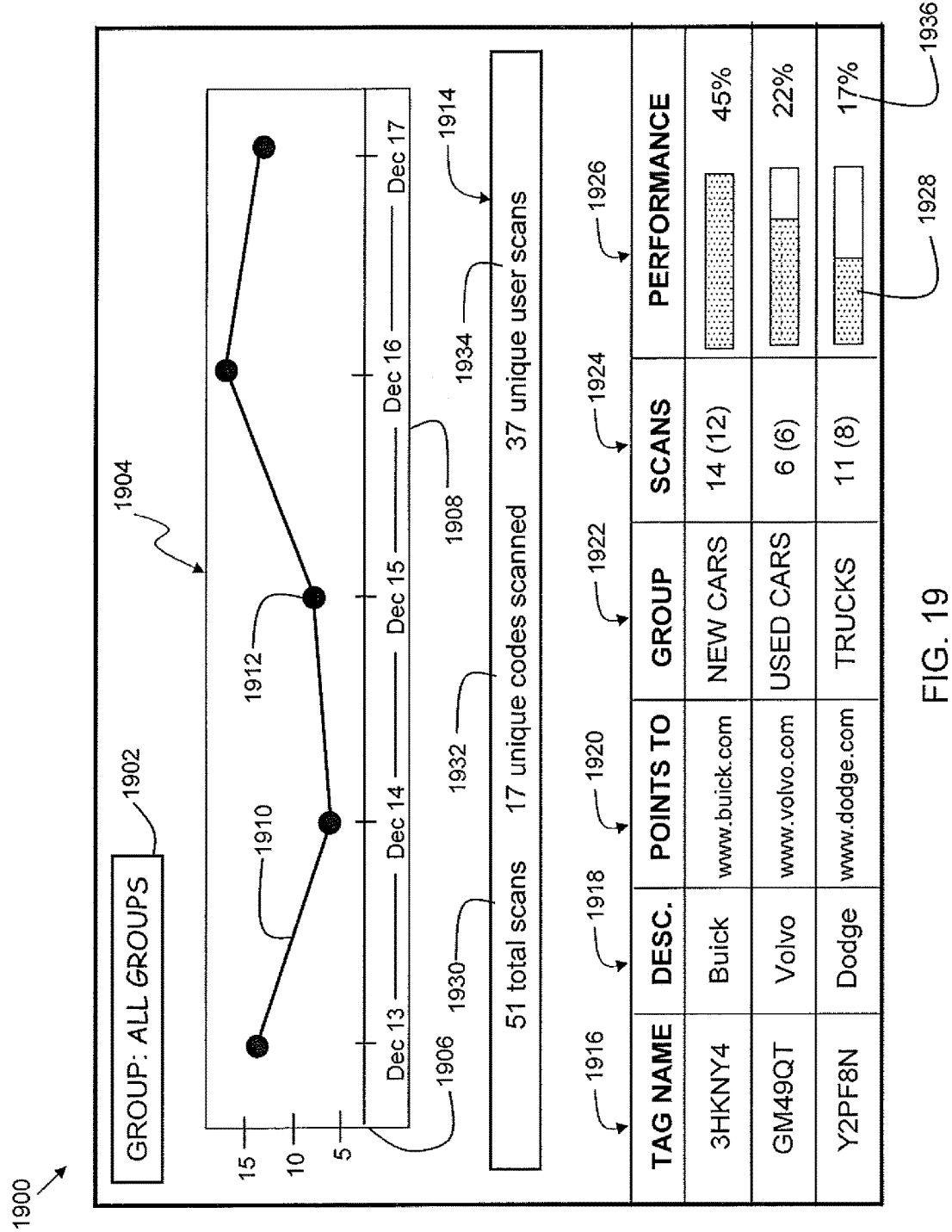
FIG. 19 shows an additional embodiment of an exemplary user interface for displaying information regarding multiple groups of tags.

FIG. 19 shows an additional embodiment of an exemplary user interface 1900 for displaying information regarding multiple groups of tags. Data field 1902 displays the group setting. This indicates which group or groups are currently displayed. In this case, information regarding all tags is displayed. Chart 1904 provides a visual indication of data query statistics information (also referred to as "analytics") regarding the tags. Chart 1904 comprises vertical axis 1906 which represents the number of data queries (scans, clicks, or texts) for one or more tags. Horizontal axis 1908 represents the date on which the data queries occurred. The result is line 1910 which indicates the trend of the data queries. The line 1910 may further comprise points 1912 which indicate the number of data queries for a given day. Data field 1914 may provide further analytics information in a text format, which may include the total number of data queries 1930 (shown as "total scans"), the number of unique data queries 1932 (the number of different tags that were queried via scan, click, or text, shown as "unique codes scanned"), and the number of different users that performed at least one data query 1934 (shown as "unique user scans").

Data field 1916 shows a tag name for each tag within the group indicated in data field 1902. Data field 1918 shows a description for each tag. Data field 1920 shows the URL associated with a particular tag. Data field 1922 shows the group to which a particular tag belongs. Data field 1924 shows the number of data queries performed for a particular tag. In one embodiment, the total number of data queries (SCT count) is shown, followed by the number of unique data queries (USCT count) which is shown next to the SCT count in parentheses. Data field 1926 shows performance information for each tag. This information may include a graphical representation 1928, as well as a textual representation 1936 of the performance of the tag. The textual representation 1936 may convey a percentage of the total data queries that a particular tag has received.

Figure 20:
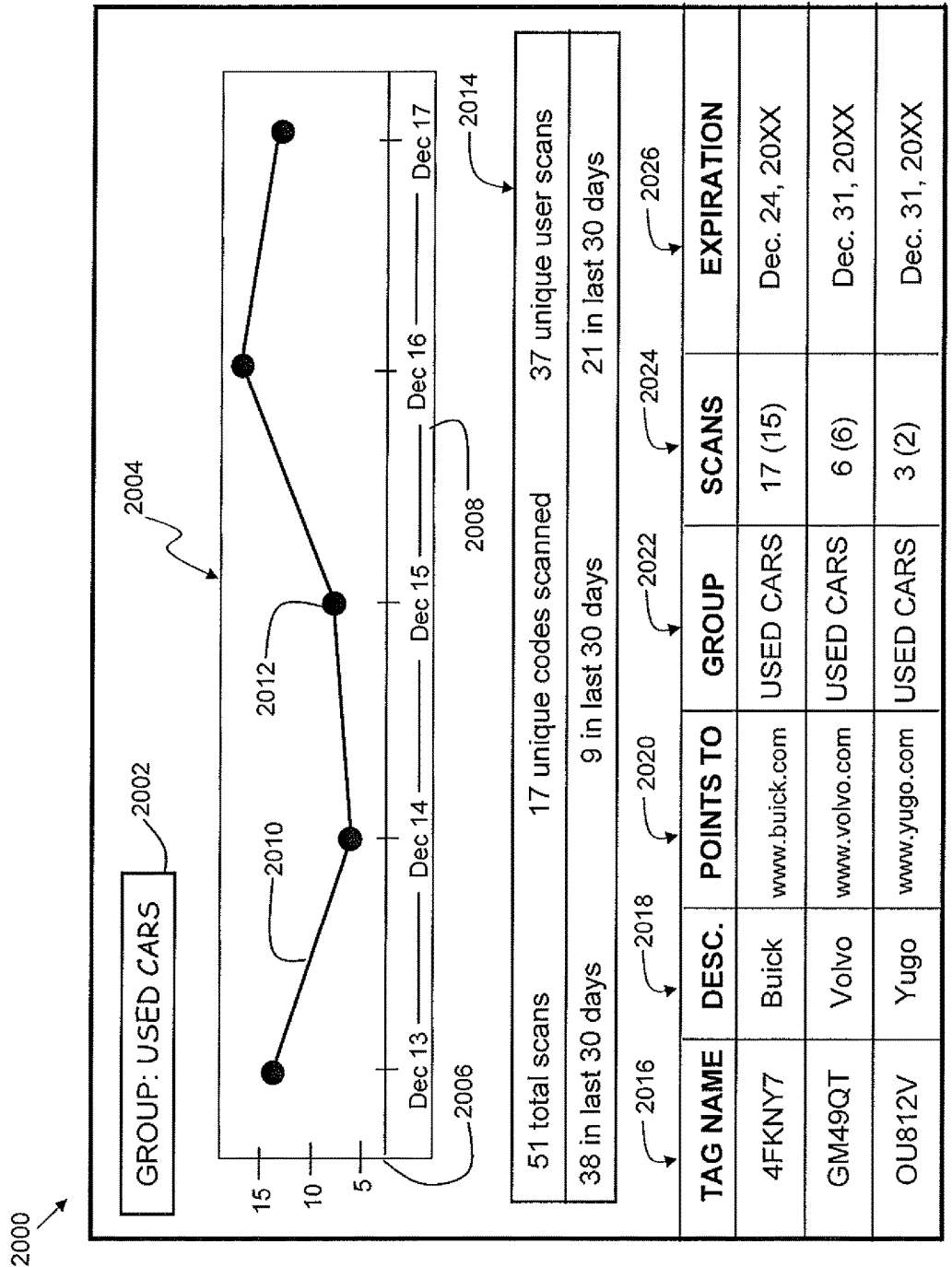
FIG. 20 shows an additional embodiment of an exemplary user interface for displaying information regarding a particular group of tags.

FIG. 20 shows an additional embodiment of an exemplary user interface 2000 for displaying information regarding a particular group of tags. Data field 2002 displays the group setting. This indicates which group or groups are currently displayed. In this case, information regarding the Used Cars group of tags is displayed. Chart 2004 provides a visual indication of information (also referred to as "analytics") regarding the tags. Chart 2004 comprises vertical axis 2006 which represents the number of data queries (scans, clicks, or texts) for one or more QR codes. Horizontal axis 2008 represents the date on which the data queries occurred. The result is line 2010 which indicates the trend of the data queries. The line 2010 may further comprise points 2012 which indicate the number of data queries for the group indicated in data field 2002 for a given day. Data field 2014 may provide further analytics information in a text format, which may include the total number of data queries (shown as "total scans"), the number of unique data queries (the number of different tags that were queried via scan, click, or text, shown as "unique codes scanned"), and the number of different users that performed at least one data query (shown as "unique user scans"). Data field 2014 may also provide these statistics for a predetermined time period, such as the last 30 days.

Data field 2016 shows a tag identifier (i.e. name) for each tag within the group indicated in data field 2002. Data field 2018 shows a description for each tag. Data field 2020 shows the URL referenced by a particular tag. Data field 2022 shows the group to which a particular tag belongs. Data field 2024 shows the number of data queries performed for a particular tag. In one embodiment, the total number of data queries (SCT count) is shown, followed by the number of unique data queries (USCT count) which is shown next to the SCT count in parentheses. Data field 2026 shows the expiration date associated with each tag.

Figure 21:
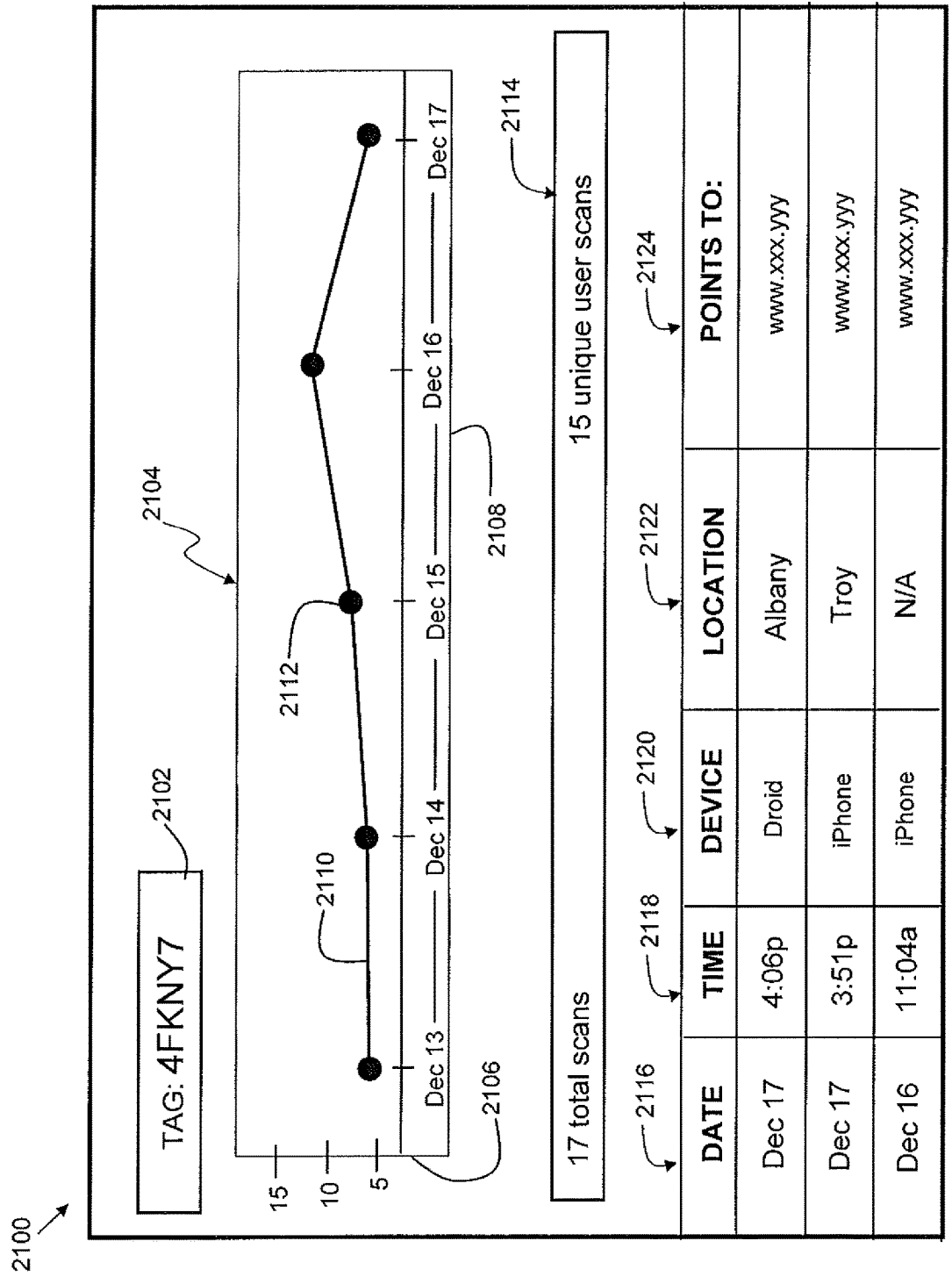
FIG. 21 shows an embodiment of an exemplary user interface for displaying information regarding a particular tag.

FIG. 21 shows an embodiment of an exemplary user interface 2100 for displaying information regarding a particular tag. Data field 2102 displays the tag for which the information shown in user interface 2100 pertains. This indicates the tag for which information is currently displayed. In this case, information regarding tag 4FKNY7 is displayed. Chart 2104 provides a visual indication of information (also referred to as "analytics") regarding this tag. Chart 2104 comprises vertical axis 2106 which represents the number of data queries (scans, clicks, or texts) for the QR tag indicated in data field 2102. Horizontal axis 2108 represents the date on which the data queries occurred. The result is line 2110 which indicates the trend of the data queries. The line 2110 may further comprise points 2112 which indicate the number of data queries for the tag indicated in data field 2102 for a given day. Data field 2114 may provide further analytics information in a text format, which may include the total number of data queries (shown as "total scans") for the given tag, and the number of different users that performed a data query (shown as "unique user scans") on this tag.

Data field 2116 shows the date on which a particular data query occurred. Data field 2118 shows the time on which a particular data query occurred. Data field 2120 shows the type of device that performed the data query. Data field 2122 shows the location, if available, where the data query occurred. The location information may be provided by the customer's device (e.g. mobile phone), and may originate from GPS coordinates, or other location identification technology, such as cell tower triangulation or IP address based location technology. Data field 2124 shows the URL referenced by the tag.

It will be recognized that the particular information and options appearing on the exemplary screens presented in this disclosure are chosen for purposes of disclosure, and that more or fewer information or options may be provided, and are included within the scope of the invention. For example, the x-axis and y-axis can optionally be swapped, or be set to provide information other than scans/click/texts per time interval, etc.

Figure 22:
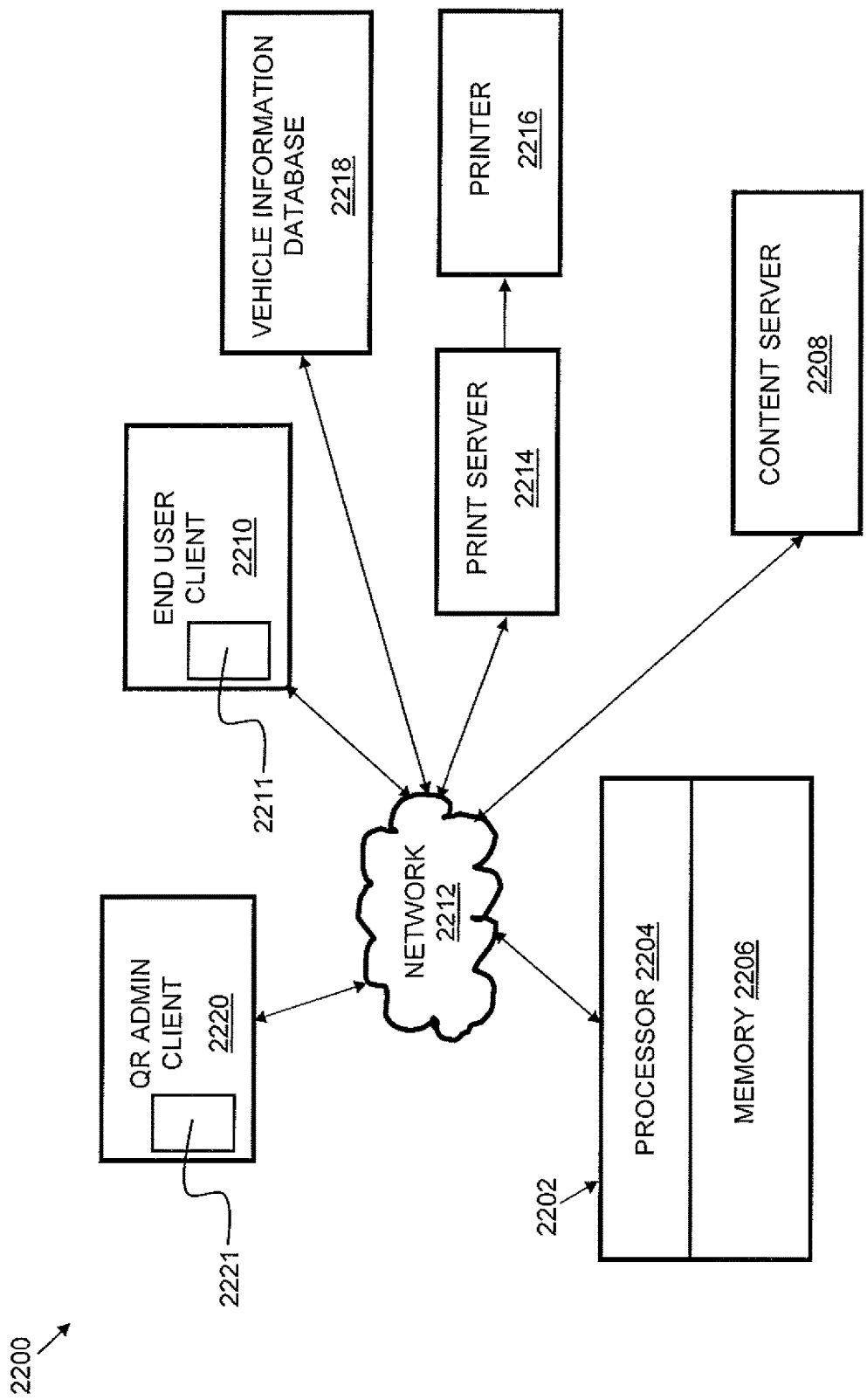
FIG. 22 is a block diagram of a system in accordance with an embodiment of the present invention.

FIG. 22 is a block diagram of a system 2200 in accordance with an embodiment of the present invention. System 2200 comprises a data management computer infrastructure which includes a computer 2202. Providing a system such as system 2200 may be part of a method for deploying a system for managing quick response information. Computer 2202 comprises a processor 2204 and memory 2206. The memory may be non-transitory, and/or flash, ROM, SRAM, or any other suitable memory/storage technology. The processor 2204 is configured and disposed to read data from memory 2206. The memory 2206 contains instructions, that when executed by the processor 2204, implement the functionality of the modules shown in the system architecture diagram of FIG. 1. It will be recognized by one of ordinary skill in this art that an embodiment may comprise multiple processors and/or multiple computers, and that some modules shown in the system architecture diagram of FIG. 1 may be implemented on separate processors and/or computers without departing from the scope and purpose of the present invention. The non-transitory memory 2206 may be implemented in any suitable technology, including, but not limited to, semiconductor or solid state memory, magnetic tape, a removable computer diskette, RAM, ROM, a rigid magnetic disk and an optical disk. Current examples of optical disks include compact disk-read-only memory (CD-ROM), compact disk-read/write (CD-R/W) and DVD.

Processor 2204 is configured and disposed to communicate via communications network 2212, to content server 2208. In one embodiment, communications network 2212 is the Internet. Content server 2208 stores item descriptive information, original (default) banner advertisement information, temporary banner advertisement information, contact widget information, and possibly additional data. The content server 2208 serves the item descriptive information, original (default) banner advertisement information, temporary banner advertisement information, contact widget information, and possibly additional data, to the display 2211 of end user client 2210. The end user client 2210 may be a smart phone device of a customer visiting the lot of the auto dealership. Embodiments of the present invention inject the EID banner and contact widgets along with the item descriptive information onto display 2211 (together referred to as an EID), when a device scans a QR code, enters a URL into a browser, or sends a text to a predetermined phone number, e.g., but not limited to, when looking for more information about a particular item after seeing a CCD. While the item descriptive information, banner, and contact widgets are aggregated into a web page and displayed together (see FIGS. 15A and 15B), they originate from independent sources, and hence, embodiments of the present invention can change the banner advertisement and/or contact widgets independently of the item descriptive information.

Print server 2214 is configured to receive CCD information from computer 2202 and render the image information using printer 2216. In one embodiment, the print server 2214 may send image information to the printer 2216 such that it is automatically printed. In other embodiments, the print job may be queued to the printer 2216 such that a user (e.g. an employee at an auto dealership) can invoke the printing at the desired time (e.g. by pressing the "start" or "run" button on the printer). In some embodiments, printer 2216 may be a solvent based printer suitable for printing on large sheets of plastic, vinyl, paper, or any other suitable material for fabrication of a consumer content display kit. The consumer content display kit (CCDK) contains multiple decals for use in promotion of the sale of a vehicle. The system 2200 may further include a vehicle information database 2218. The vehicle information database 2218 may contain standard detailed information about all available vehicles within the past several years. The standard detailed information may include, but is not limited to, engine configurations, miles per gallon (mpg) estimates, and options that are included in various trim packages. For example, in the case of a 2009 Chevrolet Cobalt LT, the vehicle information database may contain a list of the standard options for that vehicle with the "LT" trim package (e.g. automatic transmission, power remote trunk release, etc. . . . ). These options, along with the mpg estimates, may be indicated on the CCDK for that specific vehicle. Hence, when an automobile dealer has a 2009 Chevrolet Cobalt LT to sell, the system 2200 can automatically populate information in the CCDK when the automobile dealer specifies the type of vehicle. The automobile dealer can further enter in vehicle-specific information for the vehicle (e.g. color, vehicle mileage, etc. . . . ). The vehicle-specific information may be combined with the standard detailed information in the CCDK by the computer 2202.

QR administrator client 2220 may send new inventory data to computer 2202 via network 2212, such as CSV formatted data describing new inventory. In the auto dealership context, the QR Admin client 2220 may be a computer located at the auto dealership, used by an employee (e.g. a sales manager) to manage the QR tags of their inventory. The QR Admin client may also provide a user interface via a combination of any one of HTML (hyper-text mark-up language), Java, Javascript, Ruby, Python, or other web-based protocols and system. Hence, user interface screens may be rendered via web pages on display 2221 of QR Admin client 2220. Note that while computer 2202, content server 2208 and print server 2214 are shown as separate devices in FIG. 22, in some embodiments, some or all of the functionality in these devices may be combined into a single computer.

Figure 23:
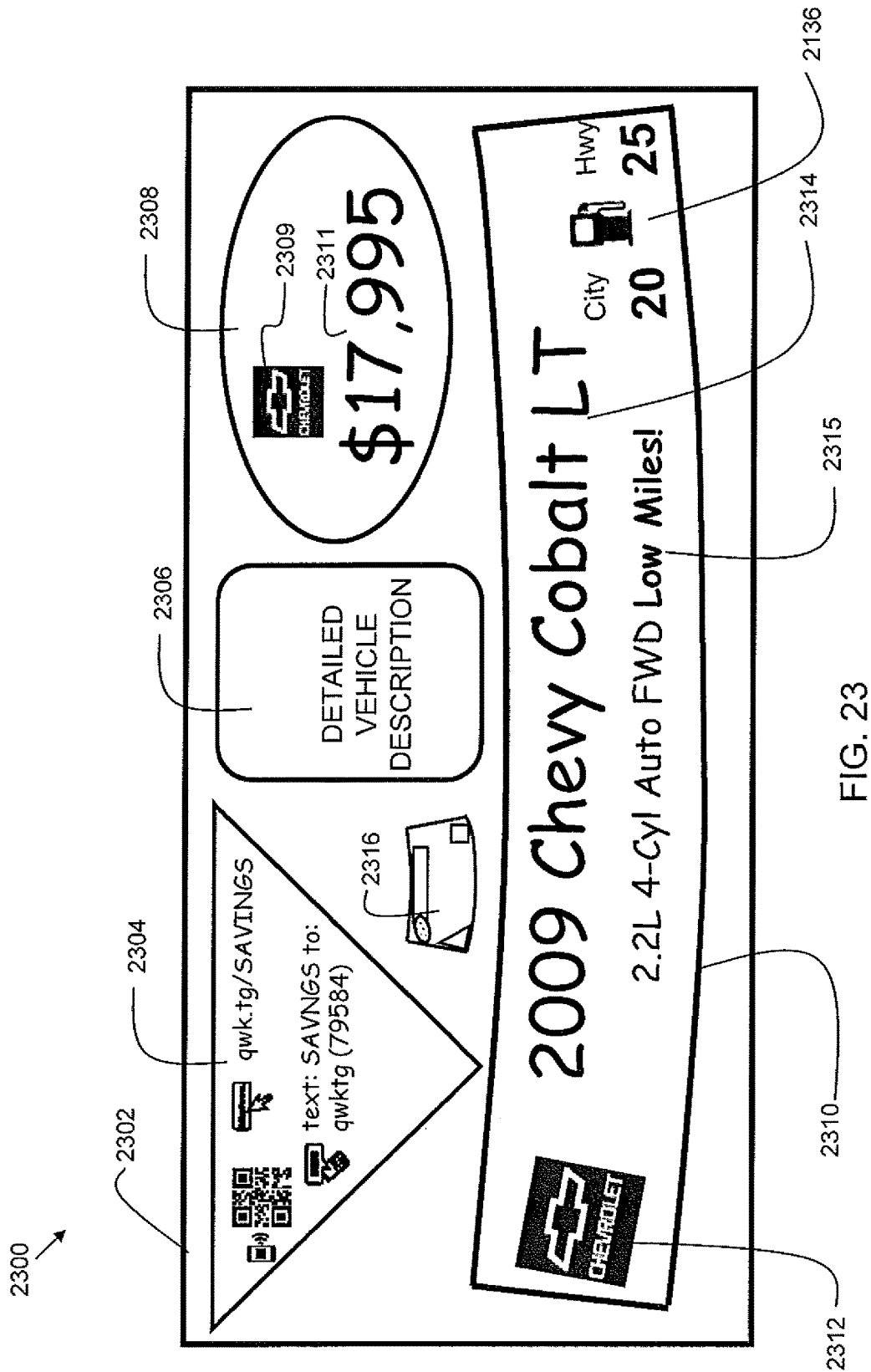
FIG. 23 is an exemplary Consumer Content Display kit in accordance with embodiments of the present invention.

FIG. 23 is an exemplary consumer content display kit 2300 in accordance with embodiments of the present invention. The consumer content display kit may serve as an on-vehicle merchandising kit. Consumer content display kit (CCDK) 2300 may be printed on a printer such as printer 2216 (FIG. 22). Display kit 2300 comprises a sheet of print-compatible material 2302, which, in embodiments, may be comprised of plastic, vinyl, paper, and/or any other suitable material. In some embodiments, the CCDK 2300 may be a single sheet for ease of printing and handling. In other embodiments, the features of the CCDK 2300 are spread over more than one sheet.

A plurality of decals are rendered on the CCDK. Decal 2304 is a mobile linked display which may include attributes of a CCD, as discussed hereinabove, for example: a QR code, a short URL code, and/or a text keyword. The term "QR code" is used herein generally to refer to any of a number of various protocols and standards, including, but not limited to, QR Codes, MS Tag, DataMatrix, Aztec, Trillcode, QuickMark, ShortCode, mCode, BeeTagg, and any other suitable tag, code, or other technology, now known or hereafter developed. Therefore, the term "quick response code" or "QR code" is not limited to its traditional definition, but encompasses all types of code-like technologies. In embodiments, decal 2304 is of a substantially triangular shape, suitable for placement in a windshield corner. Decal 2306 is a detailed vehicle description display, which may include detailed information about a particular vehicle. In some embodiments, decal 2306 is of a substantially rectangular shape. Decal 2308 is a pricing (or promotional) graphic. In embodiments, decal 2308 is of a substantially oval shape. Decal 2308 may include one or more graphic elements 2309, such as a vehicle and/or dealership logo, and a price 2311. Decal 2310 is a windshield topper, which is a banner to be placed near the top of a vehicle windshield. Decal 2310 may include one or more graphic elements 2312, such as a vehicle and/or dealership logo. Decal 2310 may further include a text display 2314 which may be used to provide an identification of the vehicle type, and other information regarding the vehicle. The text display 2314 may further include a promotional statement 2315. The promotional statement 2315 may be, for example, a phrase indicating a feature or advantage specific to a particular vehicle (e.g. "Low Miles"). In some embodiments, the promotional statement 2315 may be an option that the particular vehicle has (e.g. "Navigation!"). Optionally, a fuel usage indication 2136 may be used to display fuel consumption information, such as City and Highway mileage estimates (ratings) for the vehicle. Placement guide 2316 is a graphic indicating a preferred placement of the various decals within the vehicle windshield. It should be recognized that in some embodiments, the shapes of the decals may vary from those described herein without departing from the scope of the invention. Additionally, the content and features of such decals may contain more or fewer features. It should be recognized that in some embodiments, more or fewer decals may be included on the CCDK 2300.

Figure 24:
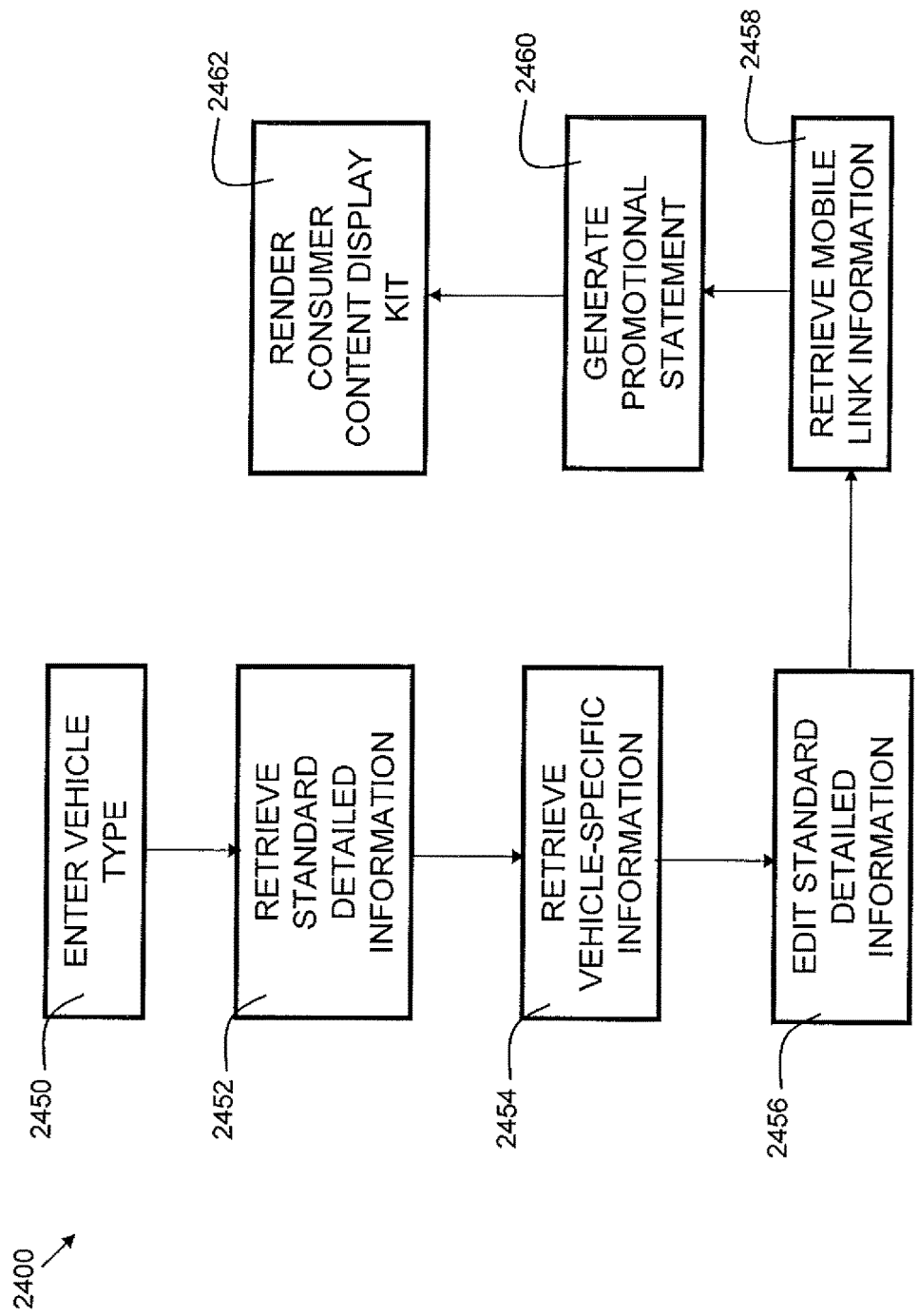
FIG. 24 is a flowchart indicating process steps for embodiments of the present invention.

FIG. 24 is a flowchart 2400 indicating process steps for embodiments of the present invention. In process step 2450, a vehicle type is entered. In embodiments, the vehicle type information may include, for example, without limitation, manufacturer, model, trim package, and model year. In process step 2452, standard detailed information is retrieved from a vehicle information database. The standard detailed information is, for example, information pertaining to a particular vehicle model, year and trim package, and may include things such as standard features, miles per gallon ratings, passenger capacity, engine type, and engine displacement. In process step 2454, vehicle-specific information is retrieved. This information is specific to a particular vehicle, and may include, but is not limited to, vehicle identification number, odometer reading (current mileage), body color, general vehicle condition ("good"

"mint", etc. . . . ), specific vehicle condition statements (e.g. "new tires," "new brakes," etc. . . . ). In process step 2456, optionally, the standard detailed information is edited by the user. For example, if the standard detailed information indicates a cloth interior, but the particular vehicle was ordered new with a leather interior, then the user may override the standard detailed information. In process step 2458, mobile link information for the particular vehicle is retrieved. The mobile link information may include, but is not limited to, a quick response (QR) code, a URL, and/or a text keyword. In process step 2460, a promotional statement may be automatically generated. Alternatively, the promotional statement may be manually entered by a user. In some embodiments, generating the promotional statement may include generating a low mileage phrase in response to vehicle-specific information indicating a vehicle mileage below a predetermined threshold. For example, if a vehicle has less than 20,000 miles, a low mileage statement may be generated for display on the windshield topper decal 2310 (FIG. 23). In some embodiments, the age of the vehicle may be used in determining a low mileage condition. For example, if the mileage of the vehicle averages less than 12,000 miles per year, based on the age of the vehicle, then a low mileage statement may be generated. In other embodiments, generating a promotional statement comprises listing an option from the standard detailed information. A predefined list of promotable options may be defined. In some embodiments, the predefined list of promotable options may include navigation, third row seating, all-wheel drive, a six cylinder engine, etc. . . . . If one of those options is present in the standard detailed information or vehicle-specific information, that option may be displayed in a promotional statement on windshield topper decal 2310. In some embodiments, automatically generating a promotional statement comprises generating a fuel economy phrase in response to standard detailed information indicating a miles per gallon rating above a predetermined threshold. For example, if the standard detailed information for a particular vehicle model and trim package indicates a highway miles per gallon rating of 35 miles per gallon or more, a fuel economy phrase may be displayed as the promotional statement on windshield topper decal 2310. The fuel economy phrase may state the actual miles per gallon, or may be a phrase indicating high fuel efficiency, such as "Great MPG!" "Sips Gas!" etc. . . . . In some embodiments, automatically generating a promotional statement comprises generating a passenger capacity phrase in response to standard detailed information indicating a passenger capacity above a predetermined threshold. For example, if a vehicle seats more than seven passengers, a passenger capacity phrase may be displayed as the promotional statement on windshield topper decal 2310. The passenger capacity phrase may state the actual passenger capacity (e.g. "Room for Eight!"), or may be a phrase indicating a high passenger capacity (e.g. "Room for the Whole Family!"). In process step 2462, a consumer content display kit is rendered. The rendering may be in the form of printed decals on a plastic or vinyl sheet, such as indicated in FIG. 23. Alternatively, a paper sheet may be used in some embodiments. It should be recognized that in some embodiments of the invention, the method 2400 may comprise more or fewer steps, and/or some steps may be performed simultaneously without departing from the scope of the present invention.

Furthermore, the invention can take the form of a computer program product accessible from a computer-usable or computer-readable medium providing program code for use by or in connection with system 2200 or any instruction execution system to provide and facilitate the capabilities of the present invention. The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, RAM, ROM, a rigid magnetic disk and an optical disk. Current examples of optical disks include compact disk read-only memory (CD-ROM), compact disk read/write (CD-R/W) and DVD. For the purposes of this description, a computer-usable or computer-readable medium can be any apparatus that can contain, store, communicate, propagate, or transport the program for use by or in connection with the instruction execution system, apparatus, or device.

In another embodiment, the invention provides a business method that performs the process of the invention on a subscription, advertising, and/or fee basis. That is, a service provider, such as a Solution Integrator, could offer to provide quick response information management. In this case, the service provider can create, maintain, support, etc., a computer infrastructure, such as computer infrastructure 2202 (FIG. 22) that performs the process of the invention for one or more customers. In return, the service provider can receive payment from the customer(s) under a subscription and/or fee agreement and/or the service provider can receive payment from the sale of advertising content to one or more third parties.

It will be recognized that in other embodiments, the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

It will be recognized that the system and method is not limited to application within an automobile dealership context. The dealership examples are used simply for the purpose of disclosure. The invention includes application in an feasible field of endeavor.

As can now be appreciated, embodiments of the present invention provide an improved system and method of managing QR tags. Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application. The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

What is claimed is:

1. A method for producing an on-vehicle merchandising kit for a vehicle, comprising:
   retrieving, by at least one computing device, standard detailed information for the vehicle;
   retrieving, by the at least one computing device, vehicle-specific information;
   retrieving, by the at least one computing device, mobile link information;
   generating, by the at least one computing device, an alphanumeric tag;
   generating, by the at least one computing device, a set of consumer content display attributes associated with the alphanumeric tag, the consumer content display attributes comprising: a path of a uniform resource locator (URL), a quick response (QR) code pointing to the URL, a text keyword, wherein the path and the text keyword is equivalent to the alphanumeric tag;
   rendering a consumer content display kit which includes at least a portion of the standard detailed information, at least a portion of the vehicle-specific information, the mobile link information, and at least one of the consumer content display attributes;
   detecting, at the at least one computing device, one or more of the group: an entry of the URL path to a browser, a scan of the QR code, or a receipt of the text keyword at a predetermined address, from a mobile device;
   in response to the detecting, transmitting by the at least one computing device, a set of electronic information display attributes associated with the alphanumeric tag to the mobile device, the set of electronic information display attributes comprising contact widgets displayable on the mobile device, the contact widgets comprising at least one of a call widget, a text widget, an email widget, or a share widget,
   wherein the call widget configures the mobile device to dial a predetermined telephone number in response to selection by a user,
   wherein the text widget configures the mobile device to open a text message composing screen with a predetermined address in response to selection by the user,
   wherein the email widget configures the mobile device to open an e-mail message composing screen with a predetermined address in response to selection by the user, and
   wherein the share widget configures the mobile device to share the information, associated with the alphanumeric tag, via an email or a social networking website in response to selection by the user; and
   recording data query statistics for the alphanumeric tag, wherein the recorded data query statistics include at least one of: a total number of scans of the QR code, a total number of clicks on the URL, a total number of texts of the text keyword to a particular telephone number, a number of user-unique scans of the QR code, a number of user-unique clicks on the URL, or a number of user-unique texts of the text keyword to the particular telephone number.

2. The method of claim 1, wherein the rendering of the consumer content display kit comprises rendering a detailed vehicle description decal, a mobile linked display decal, a pricing graphic decal, and a windshield topper decal.

3. The method of claim 2, further comprising:
rendering a placement guide indicating a preferred placement, on a vehicle windshield, of the detailed vehicle description decal, the mobile linked display decal, the pricing graphic decal, and the windshield topper decal.

4. The method of claim 1, further comprising:
generating, by the at least one computing device, another alphanumeric tag;
wherein the alphanumeric tag and the another alphanumeric tag are sequential alphanumeric identifiers.

5. The method of claim 1, further comprising:
generating, by the at least one computing device, another alphanumeric tag;
wherein the alphanumeric tag and the another alphanumeric tag are random alphanumeric identifiers.

6. The method of claim 1, wherein the generating, by the at least one computing device, the set of electronic information display attributes comprises associating, by the at least one computing device, an original banner with the alphanumeric tag.

7. The method of claim 6, further comprising generating, by the at least one computing device, a temporary banner for display in replacement of the original banner during a user-specified time period.

8. A system comprising:
a processor;
a memory medium, the memory medium comprising instructions, which when executed by the processor, cause the system to:
retrieve standard detailed information for the vehicle;
retrieve vehicle-specific information;
retrieve mobile link information;
generate an alphanumeric tag;
generate a set of consumer content display attributes associated with the alphanumeric tag, the consumer content display attributes comprising: a path of a uniform resource locator (URL), a quick response (QR) code pointing to the URL, a text keyword, wherein the path and the text keyword is equivalent to the alphanumeric tag;
render a consumer content display kit which includes at least a portion of the standard detailed information, at least a portion of the vehicle-specific information, the mobile link information, and at least one of the consumer content display attributes;
detect one or more of the group: an entry of the URL path to a browser, a scan of the QR code, or a receipt of the text keyword at a predetermined address, from a mobile device;
in response to the detecting, transmit a set of electronic information display attributes associated with the alphanumeric tag to the mobile device, the set of electronic information display attributes comprising contact widgets displayable on the mobile device, the contact widgets comprising at least one of a call widget, a text widget, an email widget, or a share widget,
wherein the call widget configures the mobile device to dial a predetermined telephone number in response to selection by a user,
wherein the text widget configures the mobile device to open a text message composing screen with a predetermined address in response to selection by the user,
wherein the email widget configures the mobile device to open an e-mail message composing screen with a predetermined address in response to selection by the user, and
wherein the share widget configures the mobile device to share the information, associated with the alphanumeric tag, via an email or a social networking website in response to selection by the user; and
record data query statistics for the alphanumeric tag, wherein the recorded data query statistics include at least one of: a total number of scans of the QR code, a total number of clicks on the URL, a total number of texts of the text keyword to a particular telephone number, a number of user-unique scans of the QR code, a number of user-unique clicks on the URL, or a number of user-unique texts of the text keyword to the particular telephone number.

9. The system of claim 8, wherein the instructions to render the consumer content display kit comprises instructions to render a detailed vehicle description decal, a mobile linked display decal, a pricing graphic decal, and a windshield topper decal.

10. The system of claim 8, the memory medium further comprising instructions for causing the system to:
render a placement guide indicating a preferred placement, on a vehicle windshield, of the detailed vehicle description decal, the mobile linked display decal, the pricing graphic decal, and the windshield topper decal.

11. The system of claim 8, the memory medium further comprising instructions for causing the system to:
generate, by the at least one computing device, another alphanumeric tag;
wherein the alphanumeric tag and the another alphanumeric tag are sequential alphanumeric identifiers.

12. The system of claim 8, the memory medium further comprising instructions for causing the system to:
generate, by the at least one computing device, another alphanumeric tag;
wherein the alphanumeric tag and the another alphanumeric tag are random alphanumeric identifiers.

13. The system of claim 8, the memory medium further comprising instructions for causing the system to associate, by the at least one computing device, an original banner with the alphanumeric tag.

14. The system of claim 13, the memory medium further comprising instructions for causing the system to generate, by the at least one computing device, a temporary banner for display in replacement of the original banner during a user-specified time period.

15. A computer program product comprising a computer readable storage device, and program instructions stored on the computer readable storage device, to:
retrieve standard detailed information for the vehicle;
retrieve vehicle-specific information;
retrieve mobile link information;
generate an alphanumeric tag;
generate a set of consumer content display attributes associated with the alphanumeric tag, the consumer content display attributes comprising: a path of a uniform resource locator (URL), a quick response (QR) code pointing to the URL, a text keyword, wherein the path and the text keyword is equivalent to the alphanumeric tag;
render a consumer content display kit which includes at least a portion of the standard detailed information, at least a portion of the vehicle-specific information, the mobile link information, and at least one of the consumer content display attributes:

detect one or more of the group: an entry of the URL path to a browser, a scan of the QR code, or a receipt of the text keyword at a predetermined address, from a mobile device;

in response to the detecting, transmit a set of electronic information display attributes associated with the alphanumeric tag to the mobile device, the set of electronic information display attributes comprising contact widgets displayable on the mobile device, the contact widgets comprising at least one of a call widget, a text widget, an email widget, or a share widget, wherein the call widget configures the mobile device to dial a predetermined telephone number in response to selection by a user, wherein the text widget configures the mobile device to open a text message composing screen with a predetermined address in response to selection by the user, wherein the email widget configures the mobile device to open an e-mail message composing screen with a predetermined address in response to selection by the user, and wherein the share widget configures the mobile device to share the information, associated with the alphanumeric tag, via an email or a social networking website in response to selection by the user; and record data query statistics for the alphanumeric tag, wherein the recorded data query statistics include at least one of: a total number of scans of the QR code, a total number of clicks on the URL, a total number of texts of the text keyword to a particular telephone number, a number of user-unique scans of the QR code, a number of user-unique clicks on the URL, or a number of user-unique texts of the text keyword to the particular telephone number.

16. The computer program product of claim 15, wherein the instructions to render the consumer content display kit comprises instructions to render a detailed vehicle description decal, a mobile linked display decal, a pricing graphic decal, and a windshield topper decal.

17. The computer program product of claim 16, the computer readable storage device further comprising instructions to render a placement guide indicating a preferred placement, on a vehicle windshield, of the detailed vehicle description decal, the mobile linked display decal, the pricing graphic decal, and the windshield topper decal.

18. The computer program product of claim 15, the computer readable storage device further comprising instructions to:

generate, by the at least one computing device, another alphanumeric tag;

wherein the alphanumeric tag and the another alphanumeric tag are sequential alphanumeric identifiers.

19. The computer program product of claim 15, the computer readable storage device further comprising instructions to:

generate, by the at least one computing device, another alphanumeric tag;

wherein the alphanumeric tag and the another alphanumeric tag are random alphanumeric identifiers.

20. The computer program product of claim 15, the computer readable storage device further comprising instructions to associate, by the at least one computing device, an original banner with the alphanumeric tag.

\* \* \* \* \*